(12) United States Patent
Owens et al.

(10) Patent No.: US 8,322,967 B2
(45) Date of Patent: Dec. 4, 2012

(54) POSITIONABLE LOADING RACK AND METHOD FOR SAFELY MOVING A LOAD

(75) Inventors: Edward P. Owens, Reno, NV (US);
Jeffery S. Fine, Carson City, NV (US);
Joseph P. Barrus, Reno, NV (US);
David Neal Mulligan, Reno, NV (US)

(73) Assignee: Clearline Distribution Inc., Reno, NV (US)

( * ) Notice: Subject to any disclaimer, the term of this patent is extended or adjusted under 35 U.S.C. 154(b) by 171 days.

(21) Appl. No.: 12/690,923

(22) Filed: Jan. 20, 2010

(65) Prior Publication Data

US 2010/0183413 A1 Jul. 22, 2010

Related U.S. Application Data

(60) Provisional application No. 61/146,057, filed on Jan. 21, 2009.

(51) Int. Cl.
*B60P 1/54* (2006.01)
(52) U.S. Cl. .......................................... 414/542; 414/348
(58) Field of Classification Search .................. 414/542, 414/543, 348; 212/277, 278, 280
See application file for complete search history.

(56) References Cited

U.S. PATENT DOCUMENTS

| | | | |
|---|---|---|---|
| 1,910,026 A * | 5/1933 | Lima | 414/542 |
| 2,557,253 A | 10/1949 | Belden | |
| 3,006,486 A | 10/1961 | Cook et al. | |
| 3,656,637 A * | 4/1972 | Lynn et al. | 414/542 |
| 4,027,807 A * | 6/1977 | Thorley | 414/545 |
| 4,187,048 A | 2/1980 | Bohimann | |
| 4,239,440 A * | 12/1980 | James | 414/542 |
| 4,297,071 A | 10/1981 | Dunbar | |
| 4,425,071 A | 1/1984 | Dunbar | |
| 4,905,848 A * | 3/1990 | Skjonberg | 212/274 |
| 5,047,773 A * | 9/1991 | Seitsonen et al. | 341/176 |
| 5,062,760 A | 11/1991 | Samaniego | |
| 5,743,702 A | 4/1998 | Gunderson | |
| 7,048,491 B2 * | 5/2006 | Windbergs | 414/542 |
| 7,134,831 B2 | 11/2006 | Risser | |
| 2006/0065052 A1 * | 3/2006 | Wada | 73/514.32 |
| 2008/0087497 A1 * | 4/2008 | Boswell et al. | 182/142 |
| 2010/0097024 A1 * | 4/2010 | Liu | 318/434 |

FOREIGN PATENT DOCUMENTS

WO WO9213736 A1 8/1992

* cited by examiner

*Primary Examiner* — Saul Rodriguez
*Assistant Examiner* — Jonathan Snelting
(74) *Attorney, Agent, or Firm* — Law Offices of David M. Lang; David M. Lang

(57) ABSTRACT

Embodiments include a loading rack apparatus mountable on a vehicle having a hoist motor, an extendable horizontal trolley to permit a load to be lifted with the hoist, moved horizontally into a vehicle, and lowered. A variety of embodiment trolley drive mechanisms are disclosed including but not limited to a lead screw trolley drive. An arcuate embodiment crossbar member permits more stable positioning of items on the apparatus's topmost surface. A method for safely moving a load is disclosed.

1 Claim, 28 Drawing Sheets

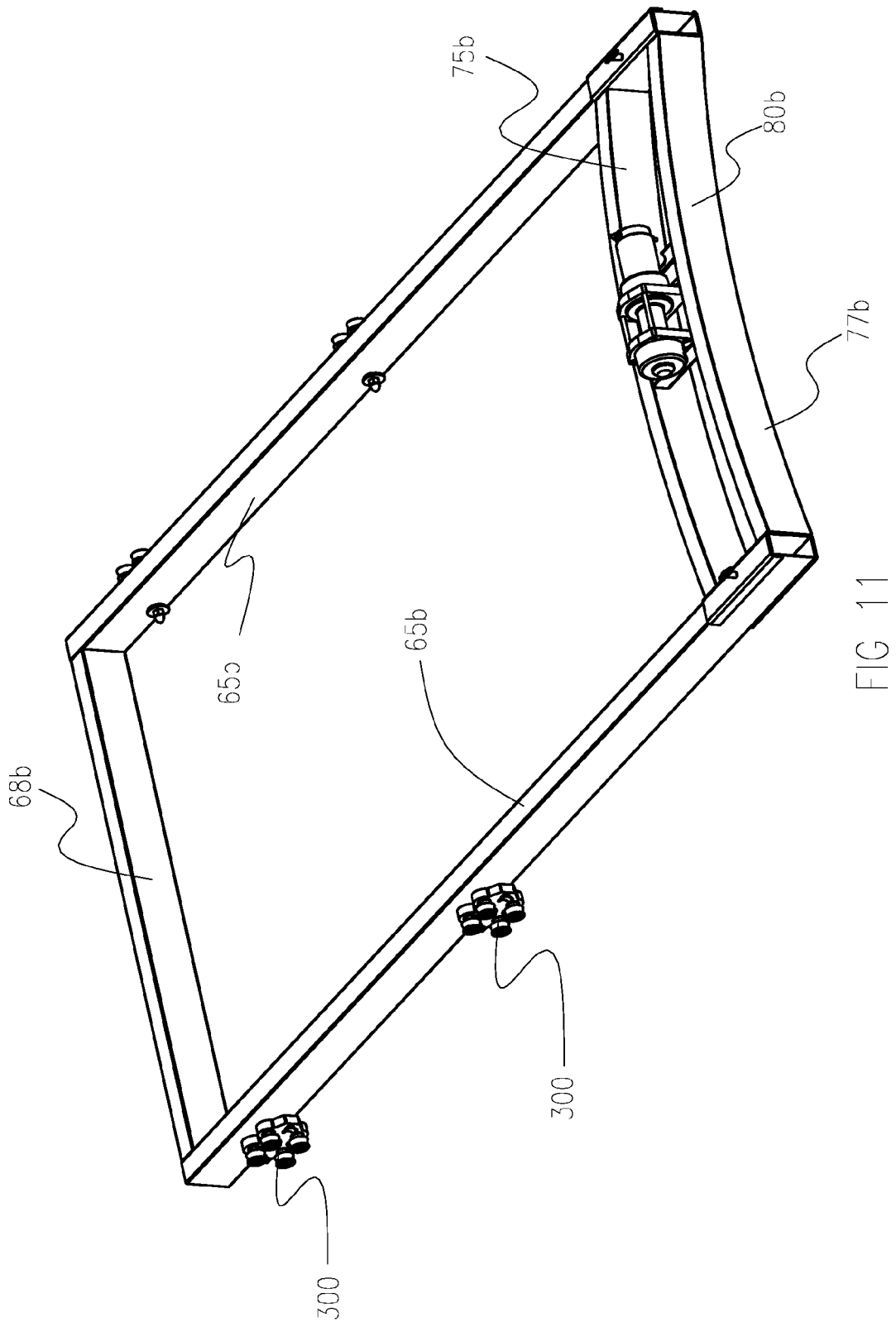

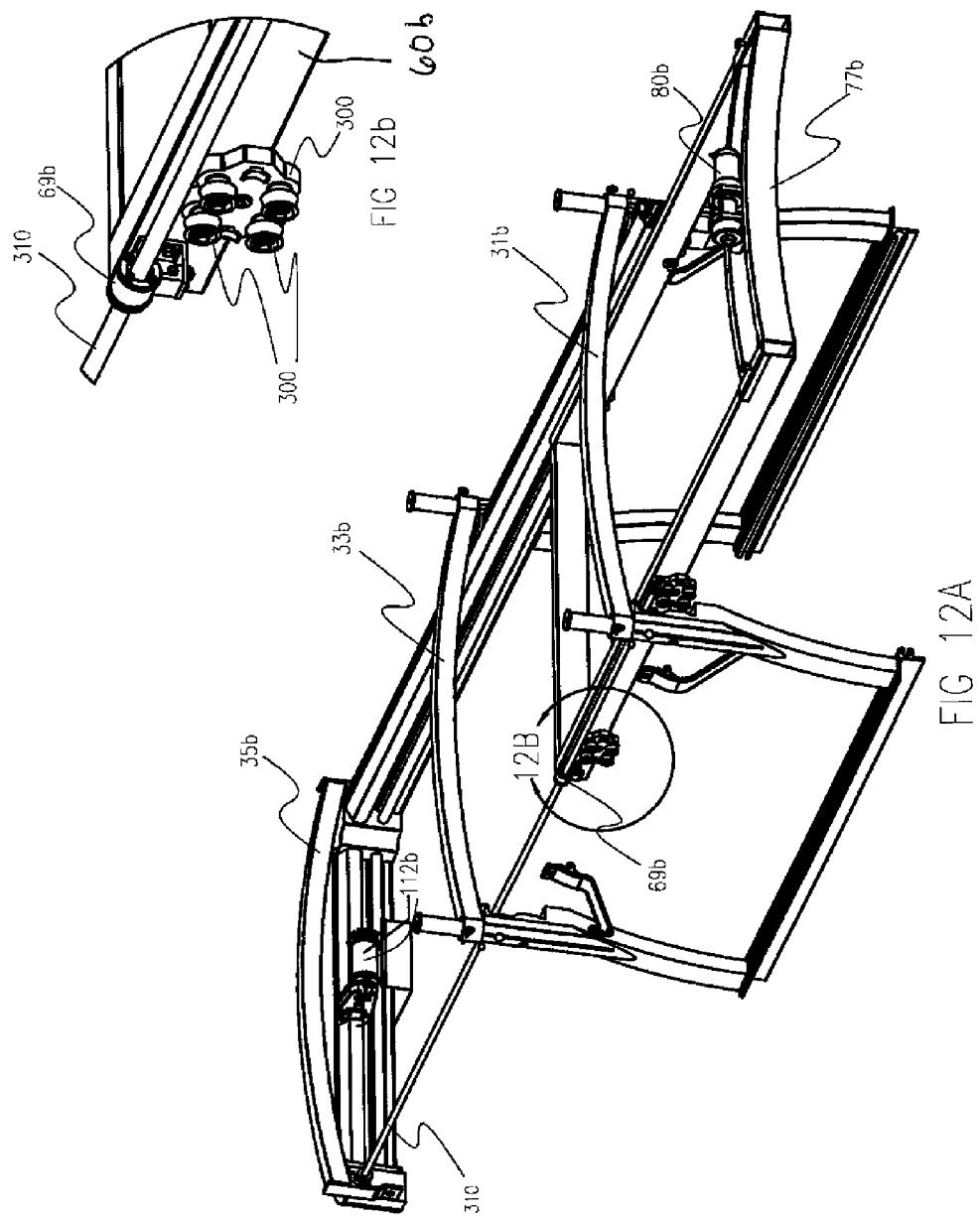

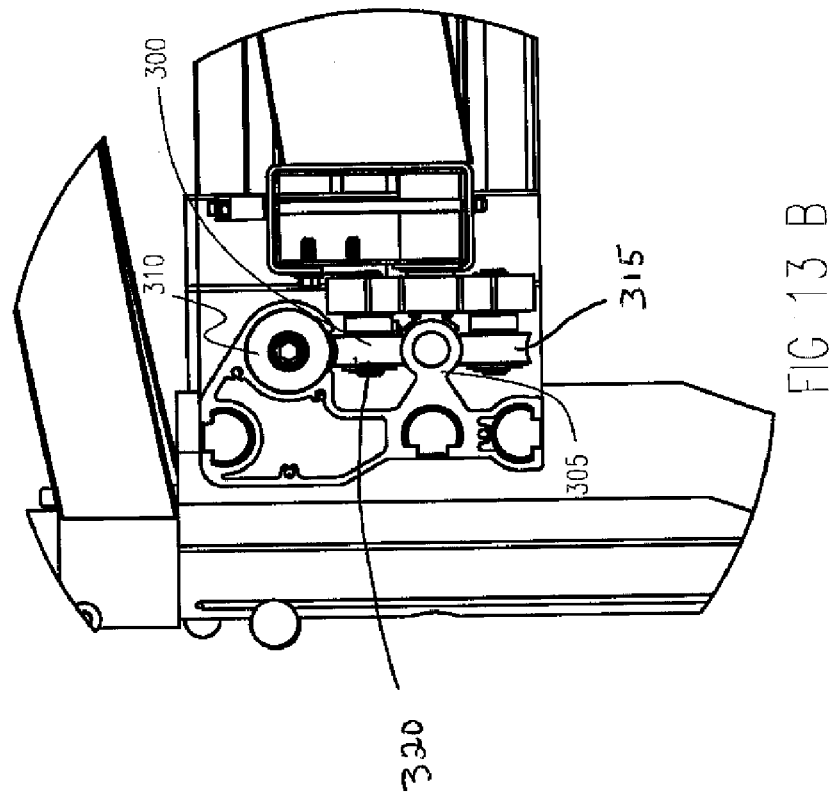
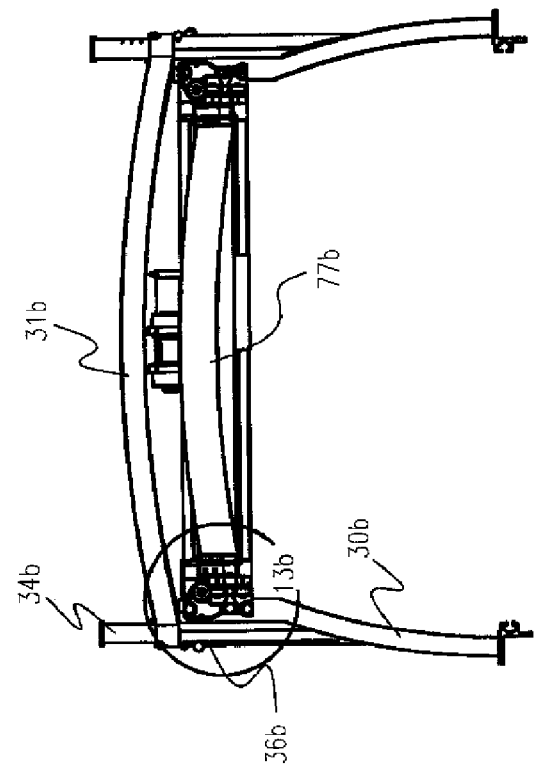
FIG 13 B
FIG 13 A

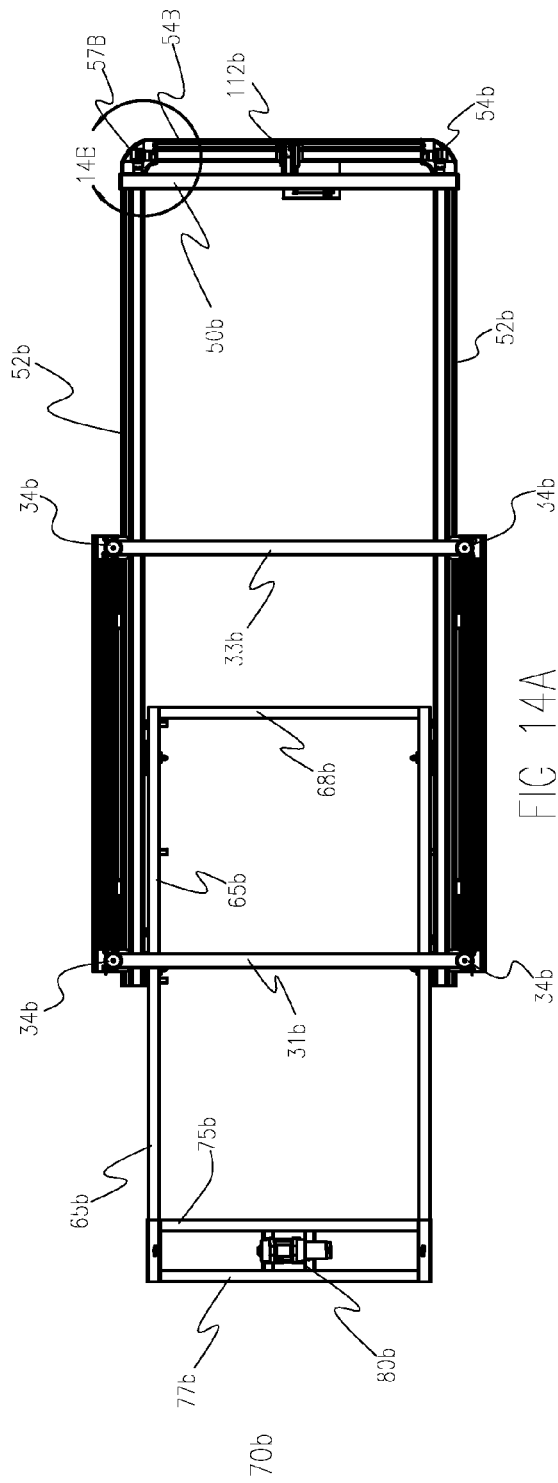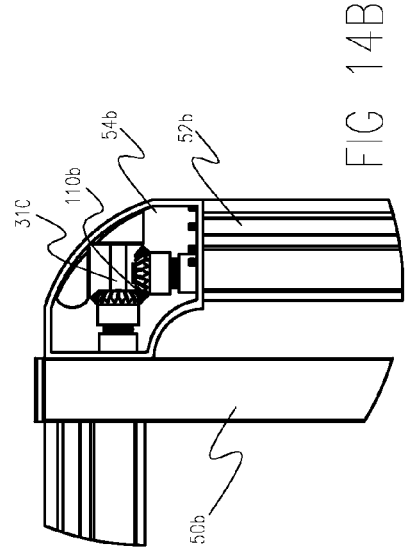

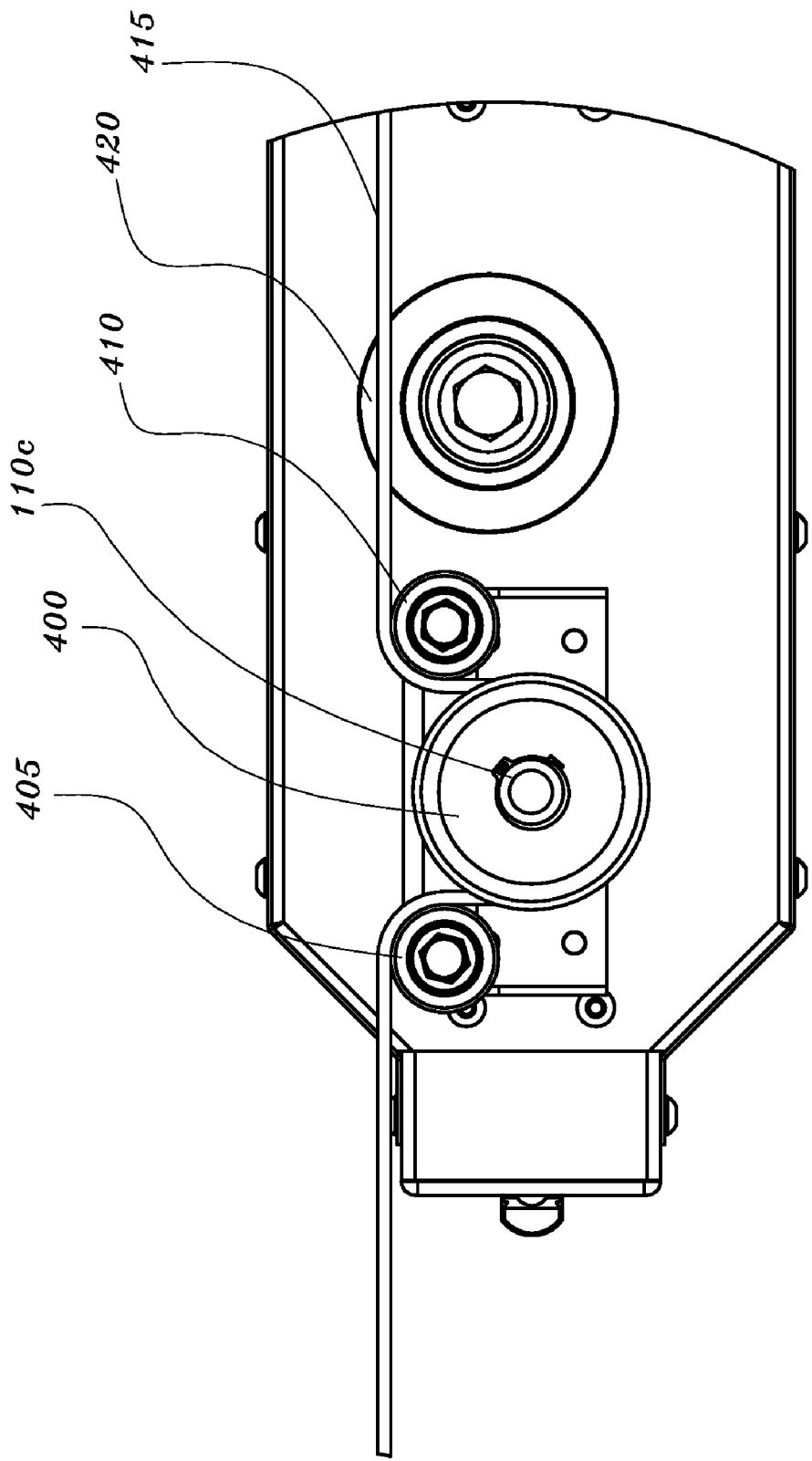

US 8,322,967 B2

POSITIONABLE LOADING RACK AND METHOD FOR SAFELY MOVING A LOAD

CROSS-REFERENCE TO RELATED APPLICATIONS

This application claims the benefit of priority under 35 U.S.C. §119(e), of U.S. Provisional Application 61/146,057, filed on Jan. 21, 2009, entitled "POSITIONABLE LOADING RACK" the entirety of which is incorporated herein by reference and made a part of the present disclosure.

FIELD OF THE INVENTION

The field of the invention relates to load management devices generally, and positionable mobile loading racks specifically.

BACKGROUND

Load management systems generally are numerous and well known in the prior art. Bridge cranes are useful in loading and unloading material in warehouses and manufacturing facilities, and have been in operation for several years. Most bridge cranes are fixed to a pier and foundation system to provide structural support for the loads they manage. Mobile cranes are often the Gantry type, an example having an I-beam down the center with an A-frame mounted on castor wheels. In this way, the load may be lifted, and the crane and load moved to another location. In some cases, such cranes have been mounted on flatbed trucks to provide further utility. A typical boom crane may be mobile where mounted in a truck. However, where mounted in a truck with an open top rear cargo area, such as a typical pickup truck, boom and Gantry cranes occupy a substantial portion of the bed and often substantially limit usage of the bed for other purposes.

Further, where cranes are adapted for use in a pickup truck, safety is an important issue. Items loaded on the back of pickup trucks are often heavy and awkward, and not uncommonly must be loaded from an incline. Thus, injury and lost productivity may be expected where a load is hoisted from unlevel ground and moves unpredictably or uncontrollably. Further, where cranes are employed to assist in moving a load, the movement of the crane apparatus itself may become dangerous and strike unsuspecting workers. Additionally, vehicle position when lifting heavy loads is important in maintaining safe lifting practices. Where a vehicle is pitched on a hill, facing upwardly or downwardly, it may tip; where a vehicle is on a less-than-horizontal surface, the vehicle may roll—often with devastating consequences.

SUMMARY

The present invention discloses a loading rack that permits more versatility and flexibility for those utilizing a truck with an open cargo area, including pickup truck owners. In a general sense, the inventive apparatus provides the user with the ability to more safely and effectively hoist a load vertically and engage a trolley to move the load horizontally into the bed of a vehicle, such as a pickup truck. Ideally, this may be accomplished through the use of motor control. Further, the inventive rack may be positionable to maximally expose the cargo bed. The inventive rack may also be used as a lumber rack. Additionally, embodiments of the inventive rack permit use of a contact based safety switch which provides a means for motor cutoff where the rack unintentionally makes, or is about to make contact with a person. Other embodiments of the present invention provide a control means for enhancing user control, providing safe apparatus operation and lifting, and allow data extraction with respect to apparatus use and performance.

BRIEF DESCRIPTION OF THE DRAWINGS

FIG. 11 is a perspective view of an embodiment trolley assembly.

FIG. 12A is a perspective view of an embodiment loading rack.

FIG. 12B is an enlarged detail view of circle 12B in FIG. 12A illustrating an embodiment wheel assembly and lead screw drive system.

FIG. 13A is an elevation view of the rear of an embodiment loading rack assembly.

FIG. 13B is an enlarged elevation view of circle 13B in illustration 13A illustrating an embodiment wheel, rail assembly and drive assembly.

FIG. 14 is a top view of an embodiment loading rack.

FIG. 24B is an enlarged detail view of circle 24B in FIG. 24A illustrating an alternative embodiment belt drive assembly.

DETAILED DESCRIPTION

Figure 1:
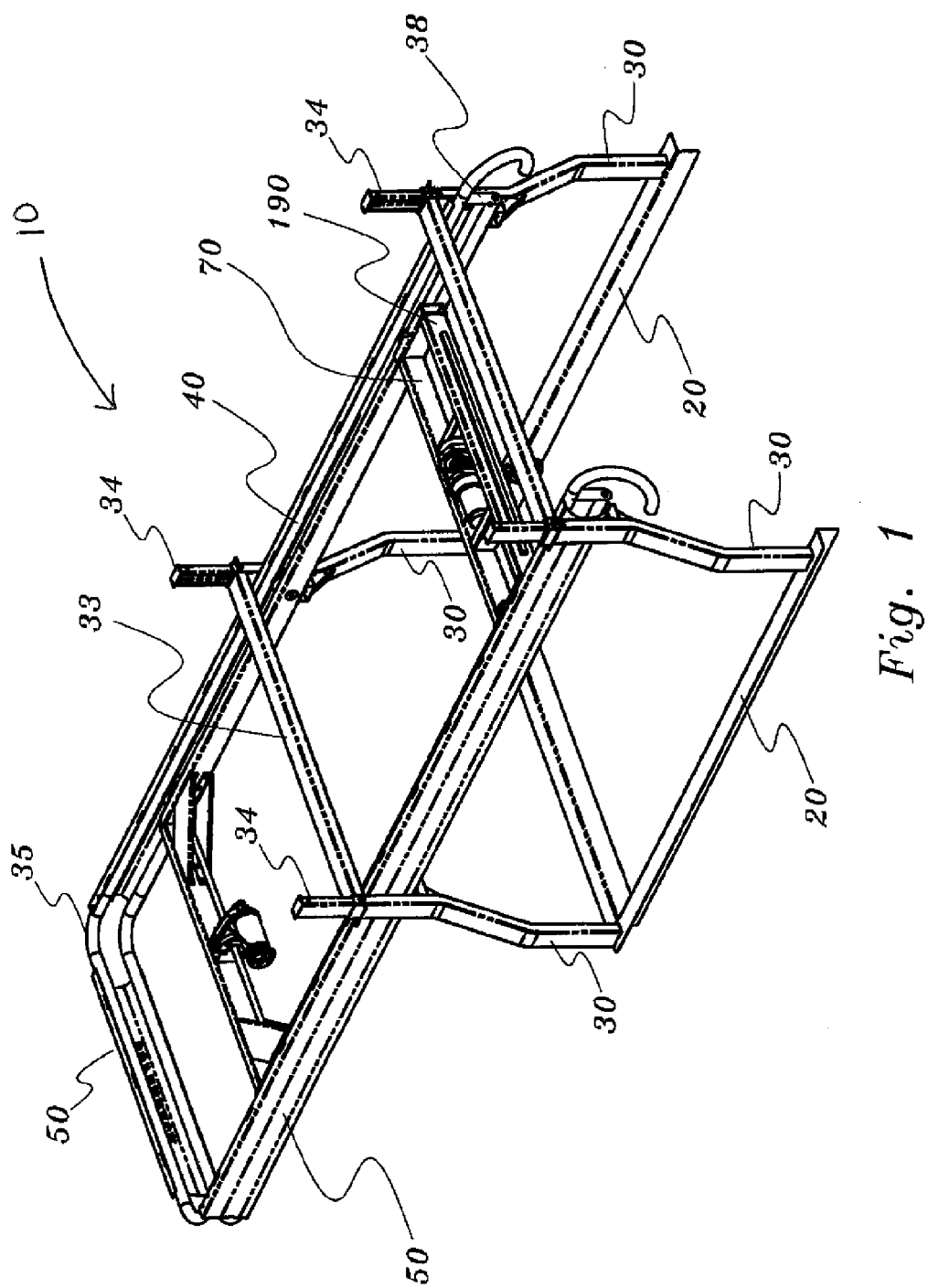
FIG. 1 is a perspective view of an embodiment loading rack.

FIG. 1 illustrates an embodiment loading rack 10 generally. Bed rail 20 rests within or on the side wall of a truck such as typical pickup truck. A plurality of substantially vertical support members 30, in a preferred embodiment there being four, are affixed to bed rail 20. In one embodiment, support members 30 angle inwardly toward the center of a truck bed. A removable front crossbar assembly 31 and rear crossbar assembly 33 reversibly fit on the terminal end of support members 30 through hollow extendable utility posts 34 at both ends of the assembly. Horizontal support structure 35 is comprised of a pair of twin rails 40 affixed to a plurality of support webs 50, some webs being coupled to the vertical support members 30, to keep rails 40 substantially parallel relative to each other. Rails 40 end at arcuate end stop 38. In one non-limiting, example embodiment, rails 40 may be comprised of 1.5 inch diameter steel tubing, and webs 50 may be comprised of 12 gauge steel plating.

Figure 2:
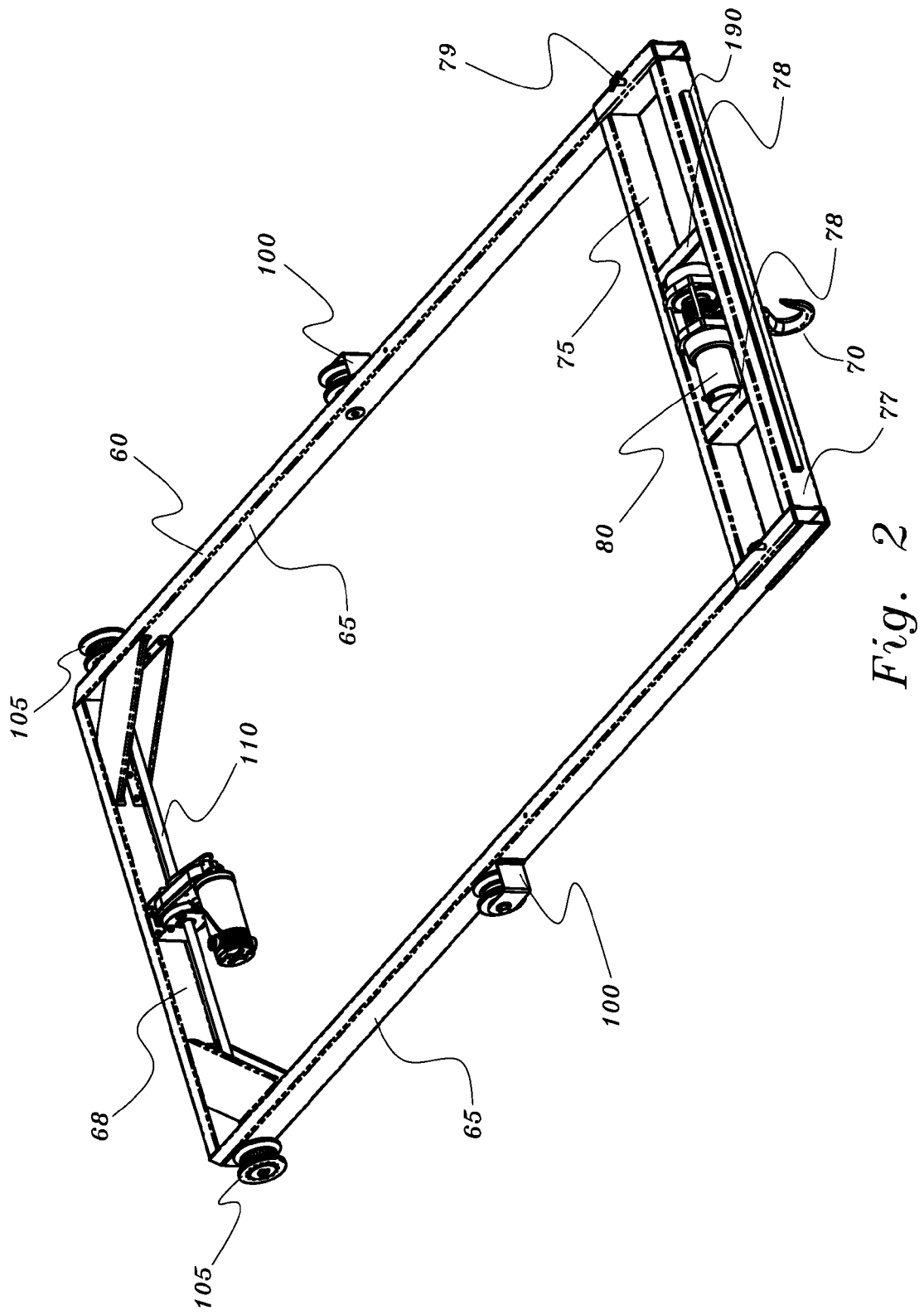
FIG. 2 is a perspective view of an embodiment trolley.
Figure 9:
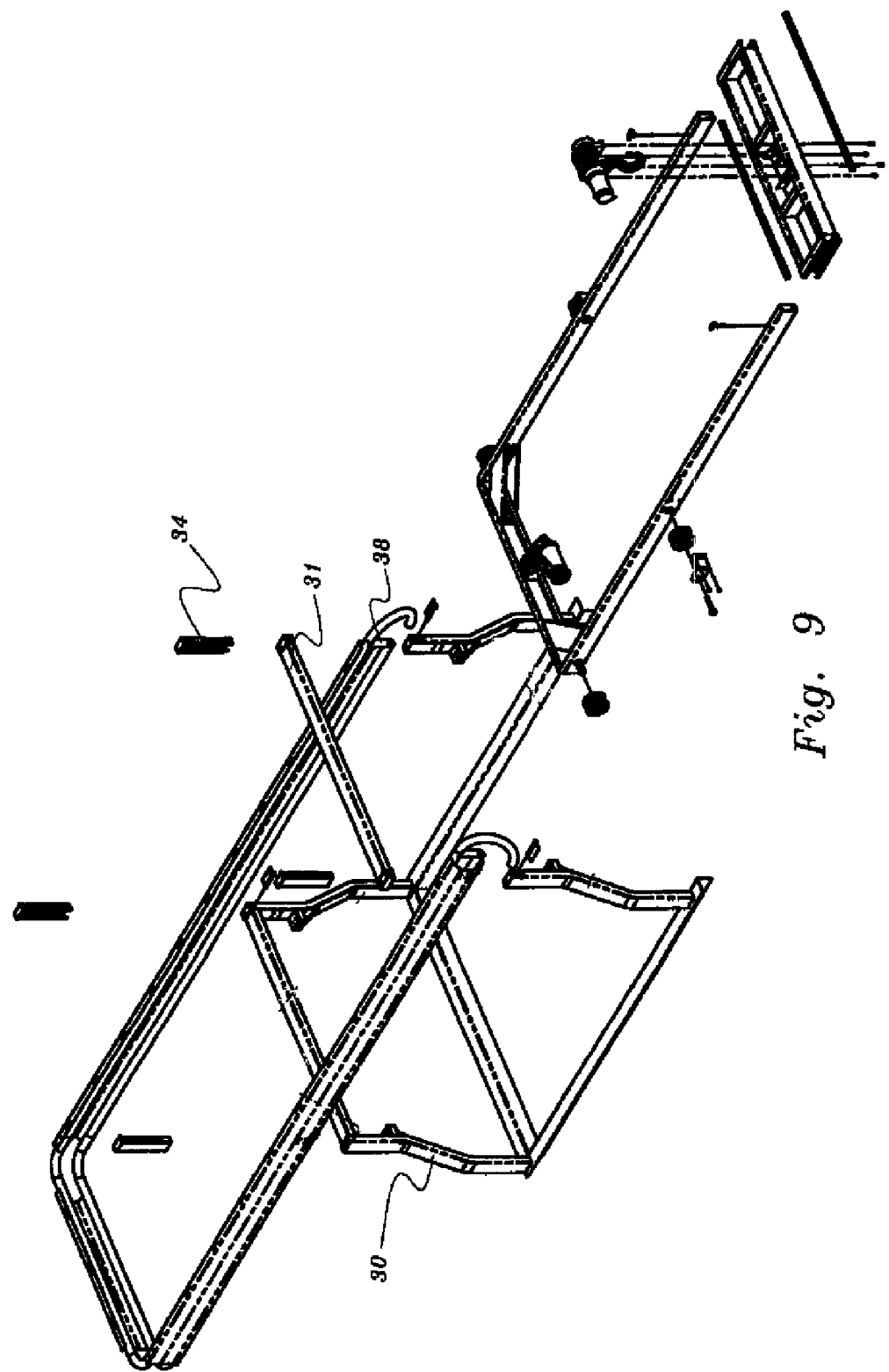
FIG. 9 is an exploded view of an embodiment loading rack.

Turning to FIG. 2, an embodiment trolley 60, is comprised of two horizontally extending members 65 held in a parallel position relative to each other by a transverse member 68 at the forwardmost end and end truck 70 at the rearwardmost end. End truck 70 is comprised of forward transverse member 75 and rearward transverse member 77 with cross-bracing members 78 therebetween, secured to extending members 65 by screw 79. Mounted on trolley 60 is a pair of pinion wheels 105, and rearward wheels 100; wheels 105 and 100 engage railing 40 and permit the trolley to be extended forwardly or backwardly relative to the horizontal support structure 35. Hoist motor 80, such as a Warn DC 350 Hoist as a non-limiting example, is mounted between cross-bracing members 78 of end truck 70 in a relatively rearward location on trolley 60. FIG. 9 illustrates an exploded view of the apparatus.

Figure 3:
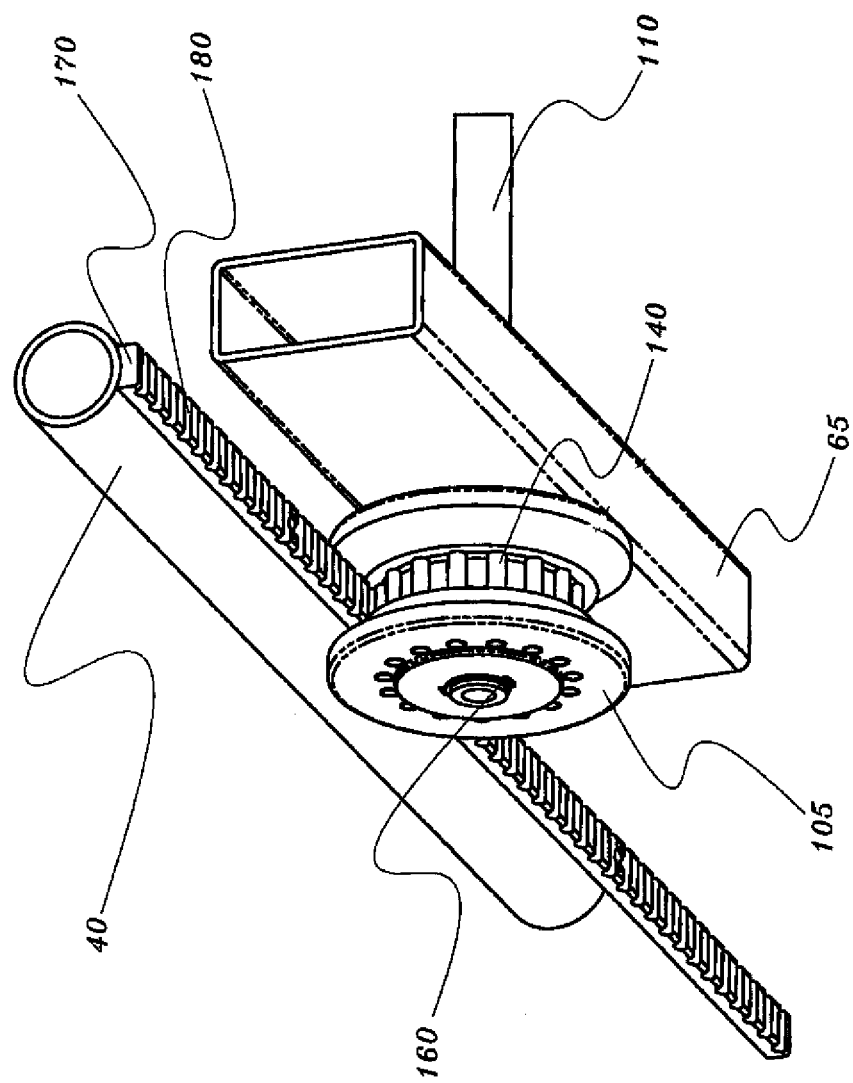
FIG. 3 is a perspective view of an embodiment drive means illustrating a rack and pinion system.
Figure 4:
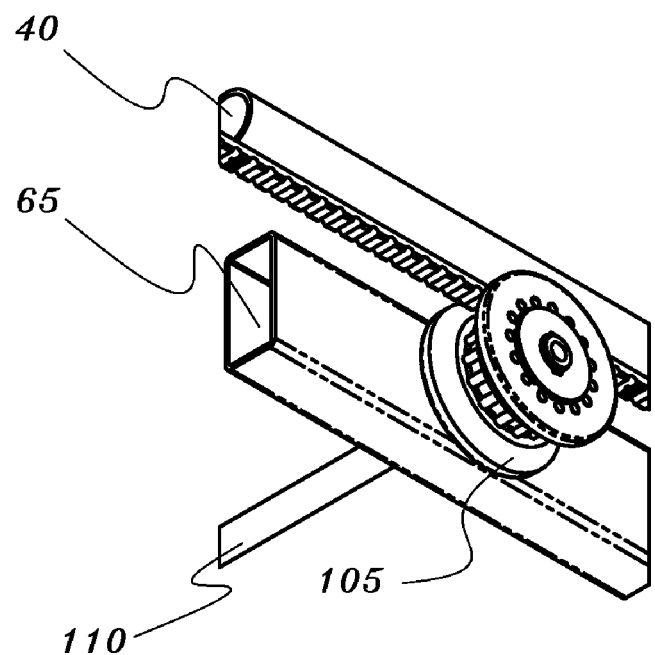
FIG. 4 is a perspective view of an embodiment rack and pinion system.
Figure 5:
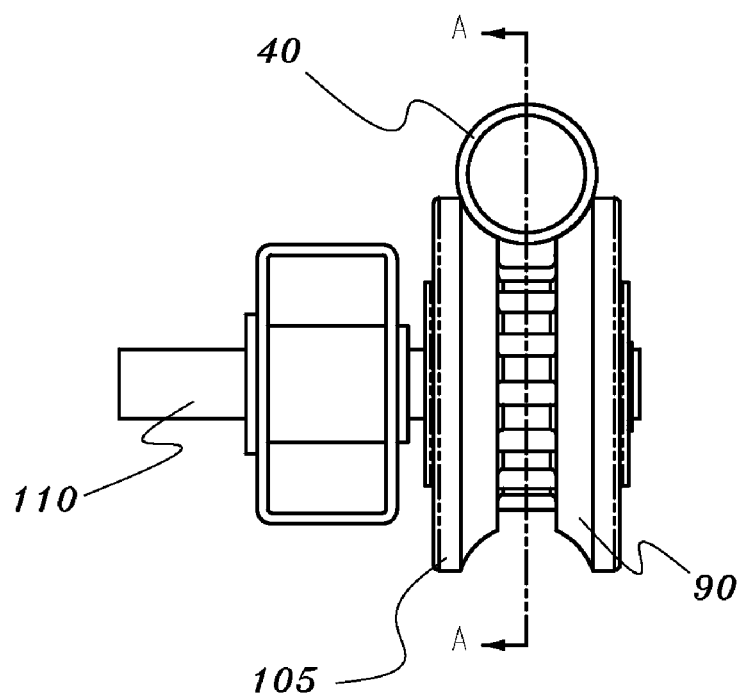
FIG. 5 is an end view of an embodiment rack and pinion system.
Figure 6:
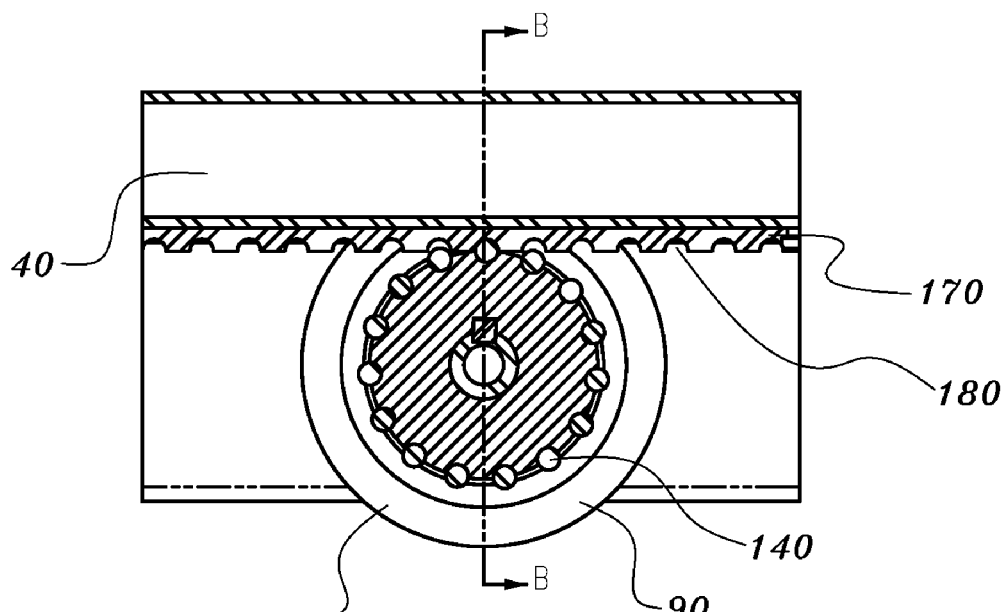
FIG. 6 is a sectional view of an embodiment rack and pinion system taken through line A-A of FIG. 5.
Figure 7:
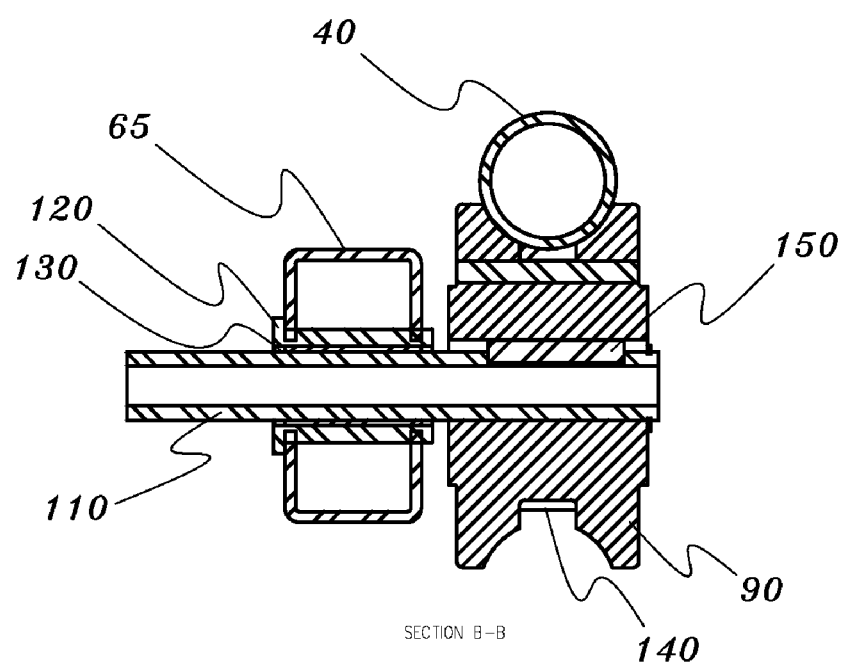
FIG. 7 is a sectional view of an embodiment rack and pinion system taken through line B-B of FIG. 6.

Wheels 100 and 105 may be comprised of a durable material such as plastic or urethane. As illustrated by FIG. 3, in one embodiment, the engaging surface of pinion wheels 105 is comprised of a plurality of projections 140. A formed and punched drive rack 170 bearing grooves 180 may be securably affixed to the surface of rails 40, closest to pinion wheels 105, by spot welding or other methods. In one embodiment, rack 170 may be affixed to one surface of rails 40, in a preferred embodiment, rack 170 is affixed to both surfaces. In one embodiment, engaging surface of wheels 100 may also bear projections, and accordingly rack 170 will be also mounted on the surface of rails 40 closest to wheels 100. In operation, a drive means such as motor 112 bidirectionally and rotatably drives driveshaft 110 and pinion wheels 105 that register with rack 170 mounted on rails 40. This permits rack and pinion bidirectional powered movement of trolley 60 relative to horizontal support structure 35. Motor 112 preferably provides ramping up, ramping down, and motor braking to provide smooth motor starting and stopping performance. In one embodiment, as a non-limiting example, a Bison gear model DC 562 Hollow Shaft Gearmotor may be used. As illustrated by FIG. 7, driveshaft 110, on both relatively terminal ends, passes an aperture through trolley 60 containing bearing housing 120 and bearing 130 surrounding driveshaft 110. In one non-limiting example embodiment, a sleeve bearing, such as an Iglide G300, may be used. The terminal portion of trolley 60 has a ridged key 150. As illustrated by FIGS. 6 and 7, at the relative terminus of driveshaft 110, pinion wheels 105 having keyway 160, are mounted at both ends of driveshaft 110 such that key 150 registers with keyway 160. In this way, bidirectional rotation of driveshaft 110 permits corresponding rotation of wheels 105.

Figure 8:
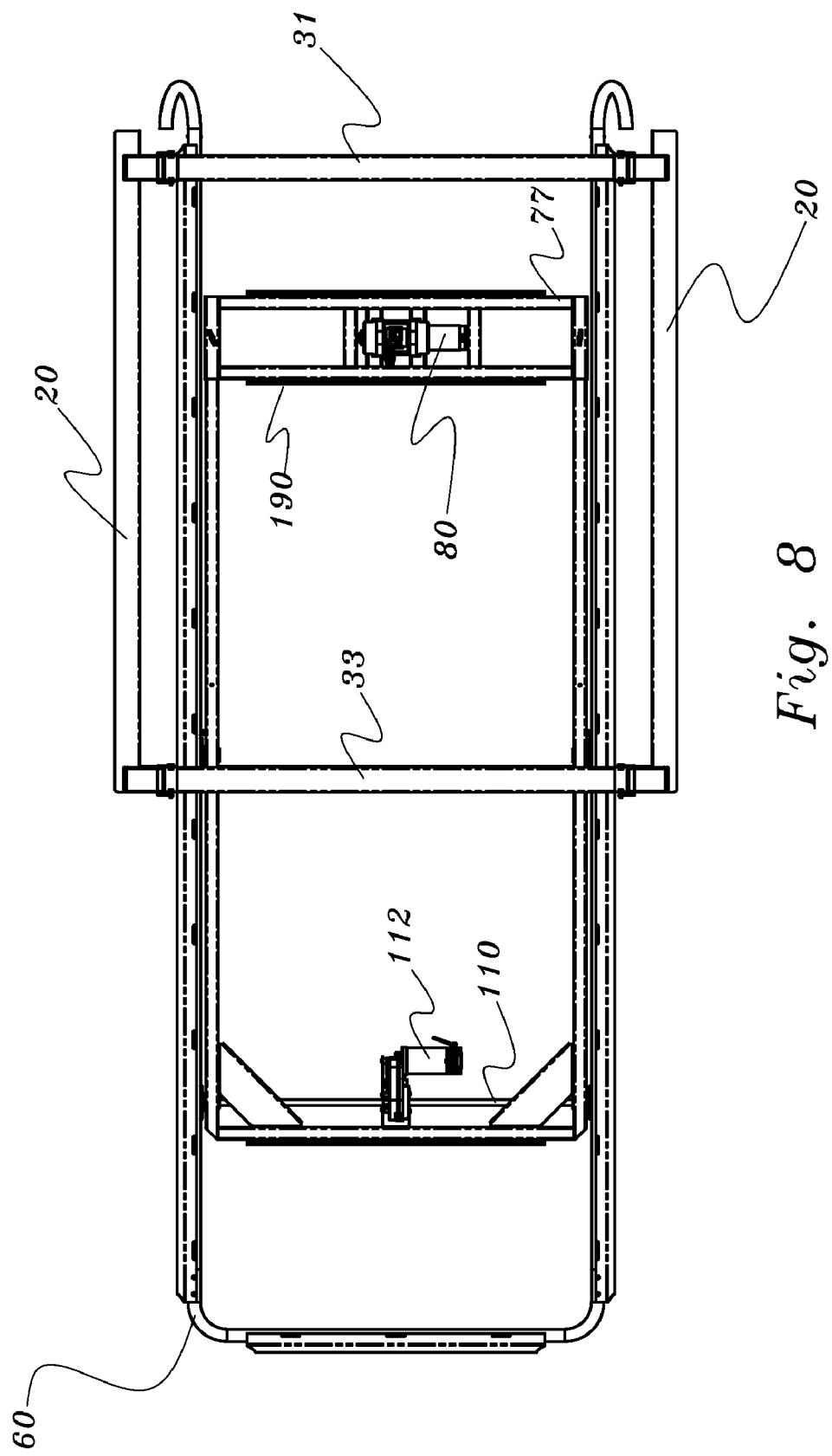
FIG. 8 is a top view of an embodiment loading rack.

Referring to FIG. 2, a pressure sensitive break switch 190 may be mounted on the rearwardly facing surface of rearward transverse member 77. As a non-limiting example, switch may be a Ribbon switch TS-3 Micro Sensing Edge manufactured by Tapeswitch™. When motor 112 is actuated, switch 190 is closed in the default. When triggering pressure is applied to switch 190, the switch is opened and the circuit is broken interrupting power to and thereby stopping motor 112. Other switches, such as a proximity sensor could be alternatively utilized. Further, a switch could be alternatively placed in other locations such as on forward transverse member 75 and/or rear crossbar 31. In operation as illustrated by FIG. 8, an object, such as a person, situated between rearward transverse member 77 and front crossbar assembly 31 (where trolley 60 is moving rearwardly) or forward transverse member 75 and rear crossbar assembly 33 (where trolley 60 is moving frontwardly) would make contact with switch 190, and automatically stop further rearward movement of trolley 60.

Figure 10:
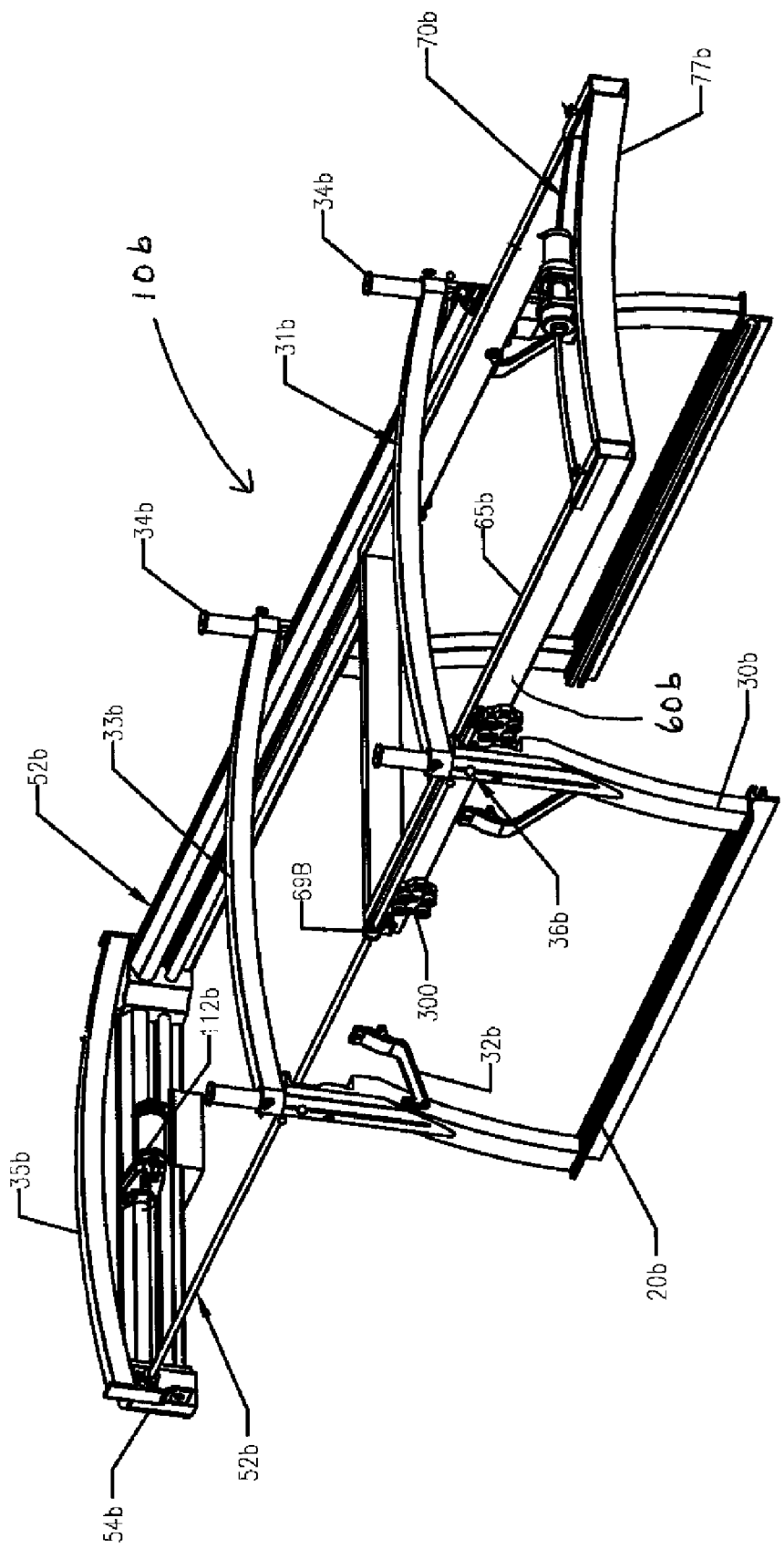
FIG. 10 is a perspective view of an embodiment loading rack with the sides removed showing the lead screw embodiment.
Figure 10B:
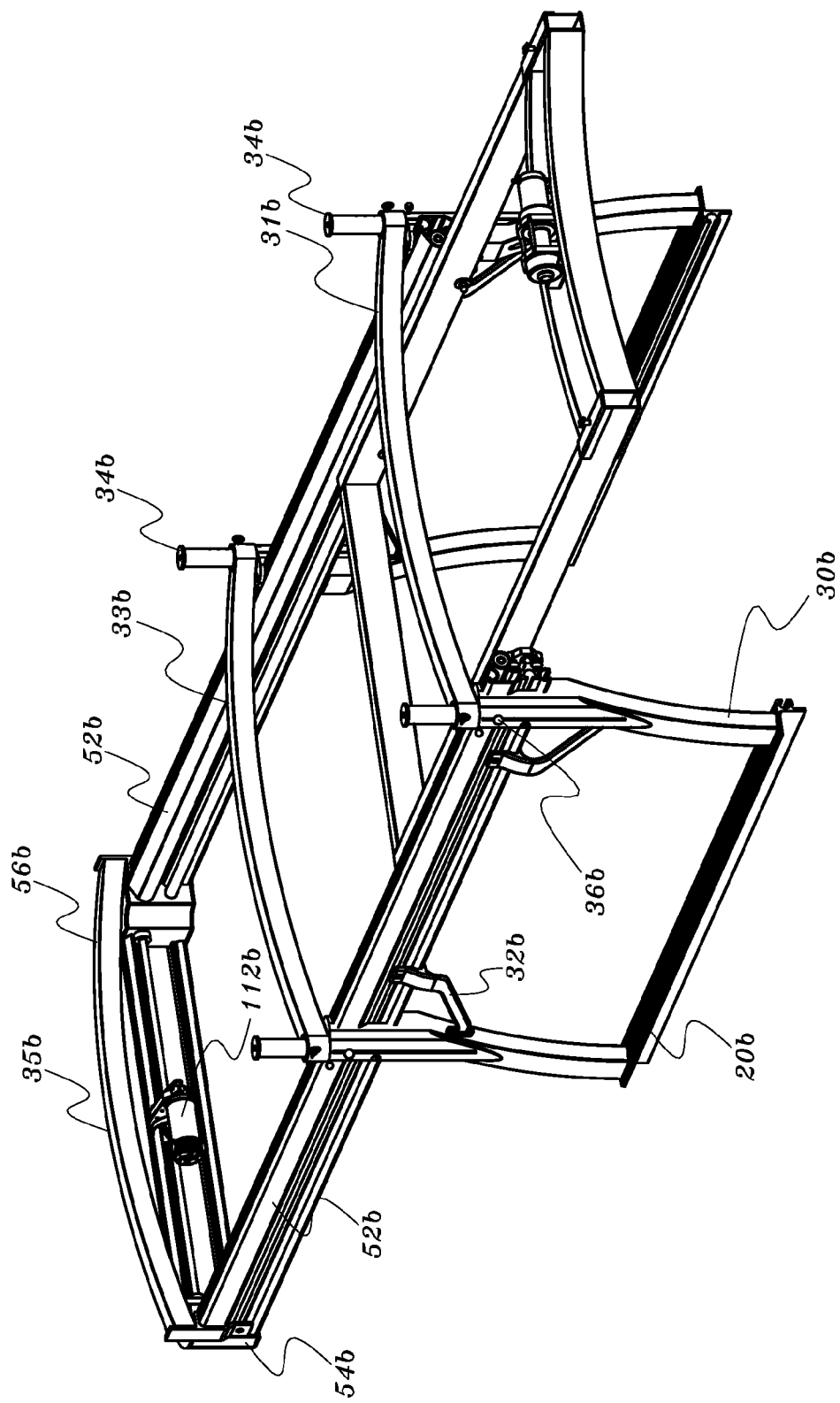
FIG. 10B is a perspective view of an embodiment loading rack showing the sides intact.

FIG. 10 illustrates an alternative embodiment apparatus, loading rack 10b generally. Bed rail 20b rests on or within the side wall of a truck such as typical pickup truck. A plurality of substantially vertical support members 30b, in a preferred embodiment there being four, are affixed to bed rail 20b. In one embodiment, a portion of support member 30b curves inwardly toward the center of a truck bed, and a portion continues upwardly and relatively perpendicular to rail 20b with reinforcement 32b extending relatively inwardly. Utility posts 34b are slidably disposed within the terminal aspect of support member 30b at the end furthest from rail 20b. Posts 34b may be extended from the end of members 30b, facilitated by positioning pegs 36b, to achieve a desired height, or retracted fully within member 30b.

A removable crossbar assembly, which in one embodiment comprises arcuate front crossbar assembly 31b and arcuate middle crossbar assembly 33b which reversibly fit over utility posts 34b at both ends of the assembly with either or both of the relatively concave side of arcuate assembly 31b and/or 33b facing upwardly downwardly. Arcuate rear crossbar assembly 35b, is mounted to a relatively front portion of horizontal support structure 50b. In an alternative embodiment, some or all of the crossbars may be permanently affixed to horizontal support structure 50b and/or member 30b. The arcuate crossbar assembly may provide more stable and secure loading of materials on the top surface of the apparatus. For example, where the assembly's concave surface is oriented to be facing downwardly (as shown by FIG. 10), long cylindrical materials such as pipe, tubing, rebar, and the like, may advantageously settle into the corner formed by the arch and the vertical utility post. Ladders, and other equipment long enough to span front crossbar assembly 31b and middle crossbar assembly 33b, may also advantageously settle against the posts 34b for additional safety and stability.

As illustrated by FIG. 14, an alternative horizontal support structure 50b, comprises a partial frame having sides 52b and front support 54b, forming corners therebetween. Sides 52b are affixed to support members 30b and reinforcement 32b as shown by FIG. 10.

Figure 15:
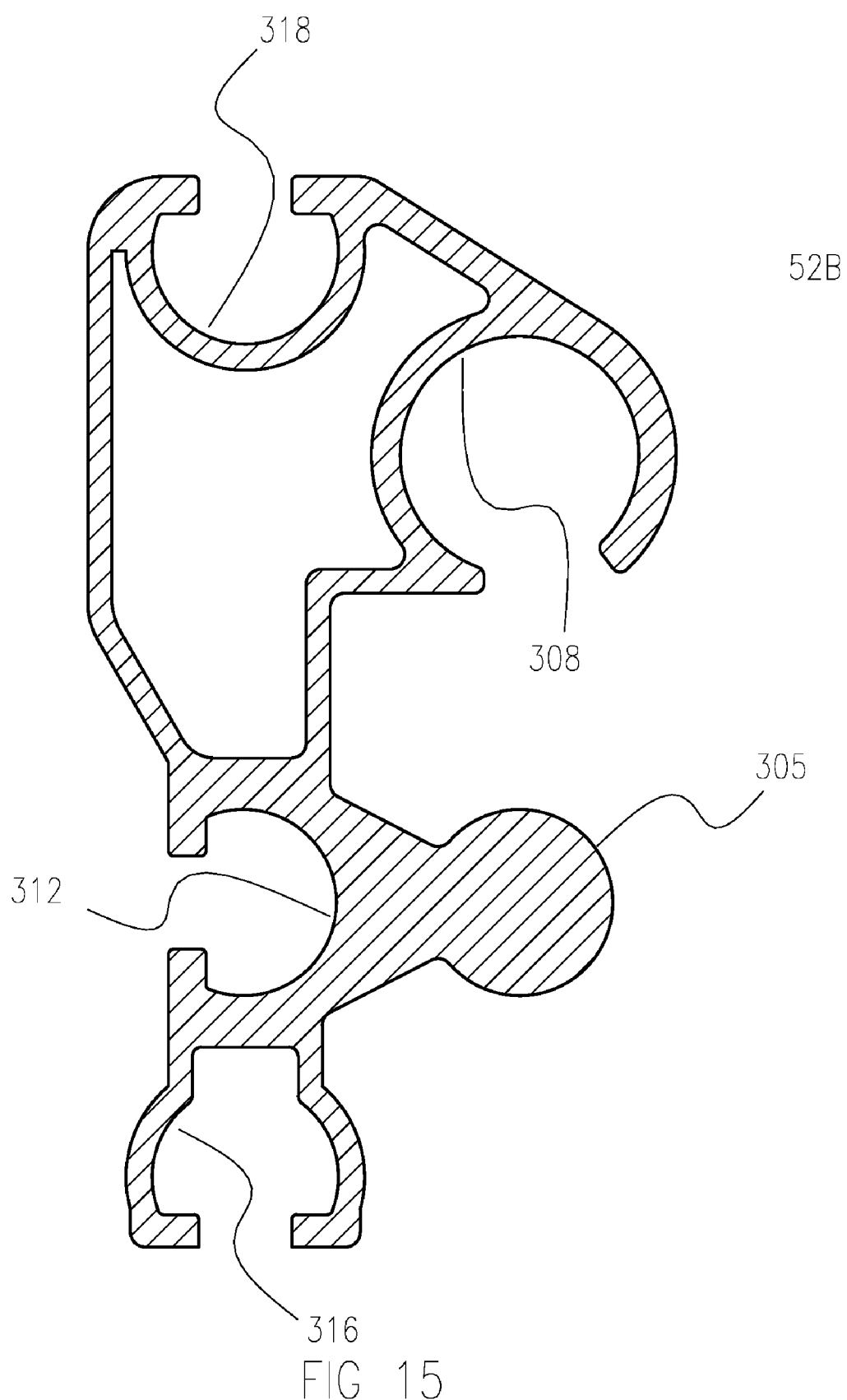
FIG. 15 is an end view of the sides of an embodiment horizontal support structure of the present invention.
Figure 16:
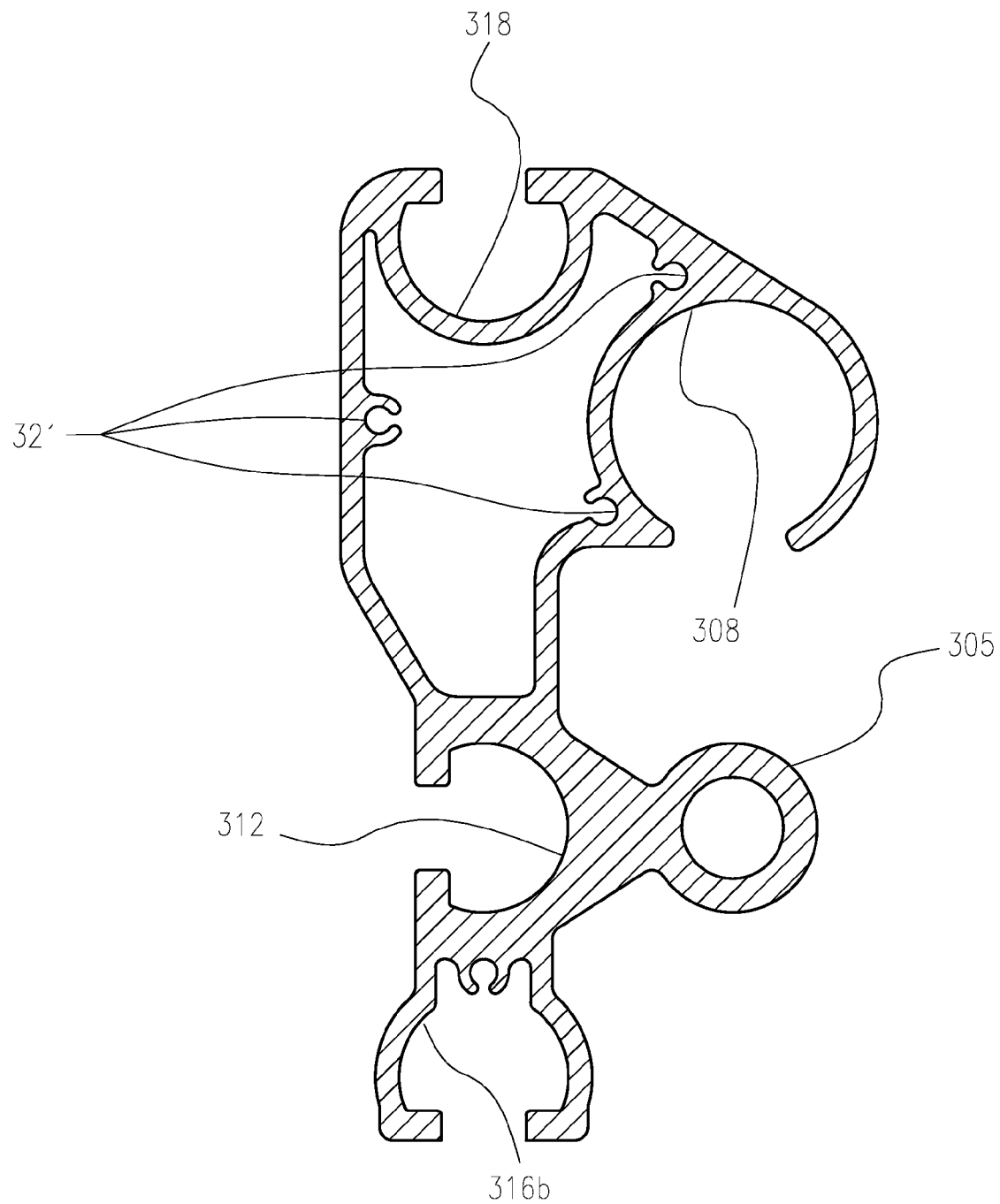
FIG. 16 is an end view of the sides of an embodiment horizontal support structure of the present invention.
Figure 17:
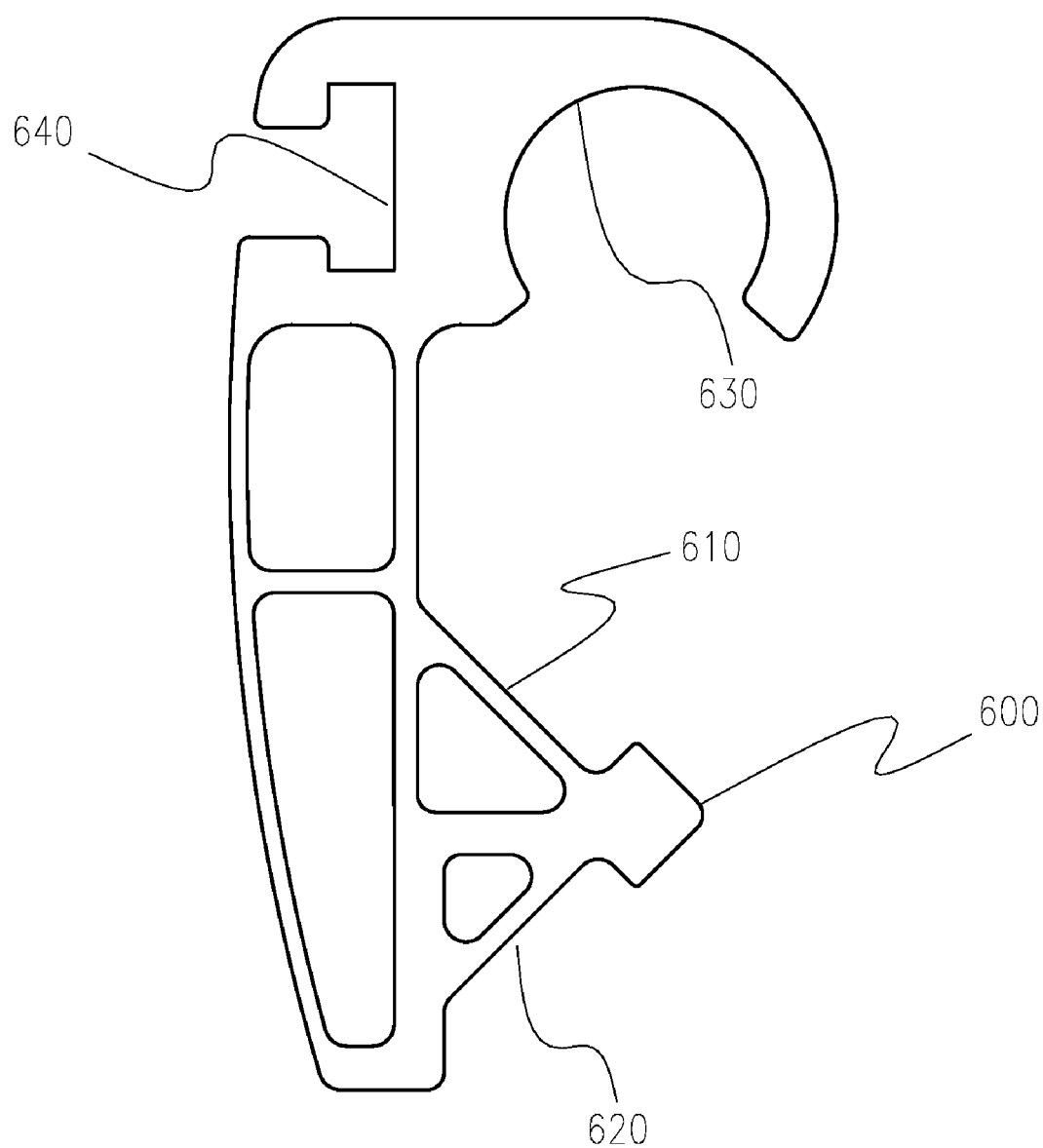
FIG. 17 is an end view of the sides of an embodiment horizontal support structure of the present invention.
Figure 18:
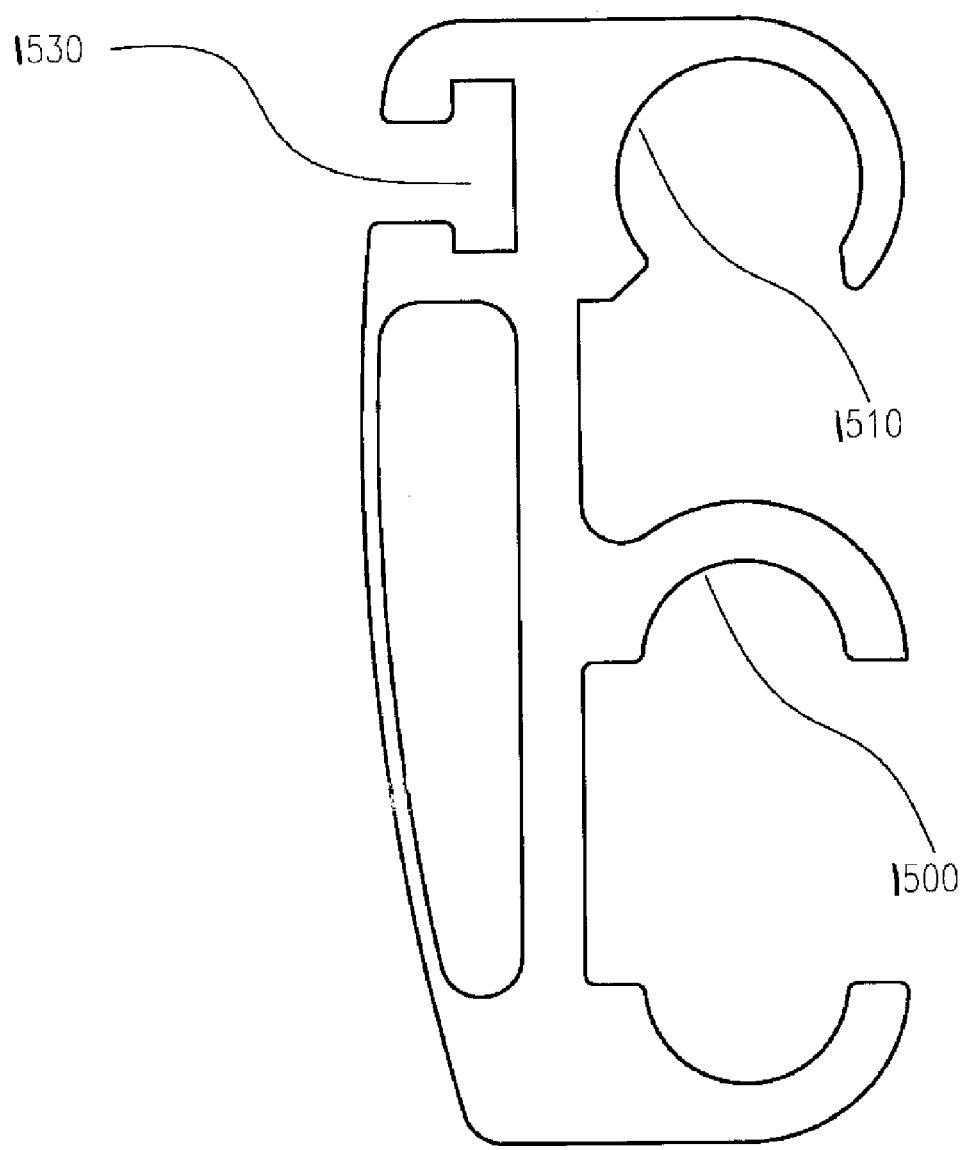
FIG. 18 is an end view of the sides of an embodiment horizontal support structure alternate of the present invention.

FIGS. 15 and 16 illustrate an end view of sides 52b without additional components included. FIG. 15 illustrates a simplified embodiment extrusion shape, with FIG. 16 illustrating a preferred embodiment extrusion shape. In a preferred embodiment, sides 52b are formed as an aluminum extruded component. In one embodiment, horizontal member may be formed of a single, integrally formed extruded member. Sides 52b are shaped to define screw recesses 308, wheel guide 305, and a T-slot accessory recess 312. Recess 312 may accommodate standard additional which may be insertably placed therein. As illustrated by FIG. 16, lower channel 316b may serve as an attachment point for structure of system or optional equipment (e.g. tarps hold or tie-down points and upper channel 318 also may serve as an attachment point for structure of system or optional equipment (e.g. tarps hold or tie-down points). FIG. 16 illustrates a cross-section of sides 52b adapted to contain screw recesses 321 which likewise may serve attachment point for structure of system or optional equipment (i.e. tarps, holds, or tie down points). In an alternative embodiment, component sides 52b and front 54b of partial frame may be formed of all steel, bent, and welded. In another embodiment, the borders of the partial frame may be securably affixed at the corners. FIGS. 17 and 18 provide example alternate extrusion shapes for embodiments for sides 50b.

Figure 19:
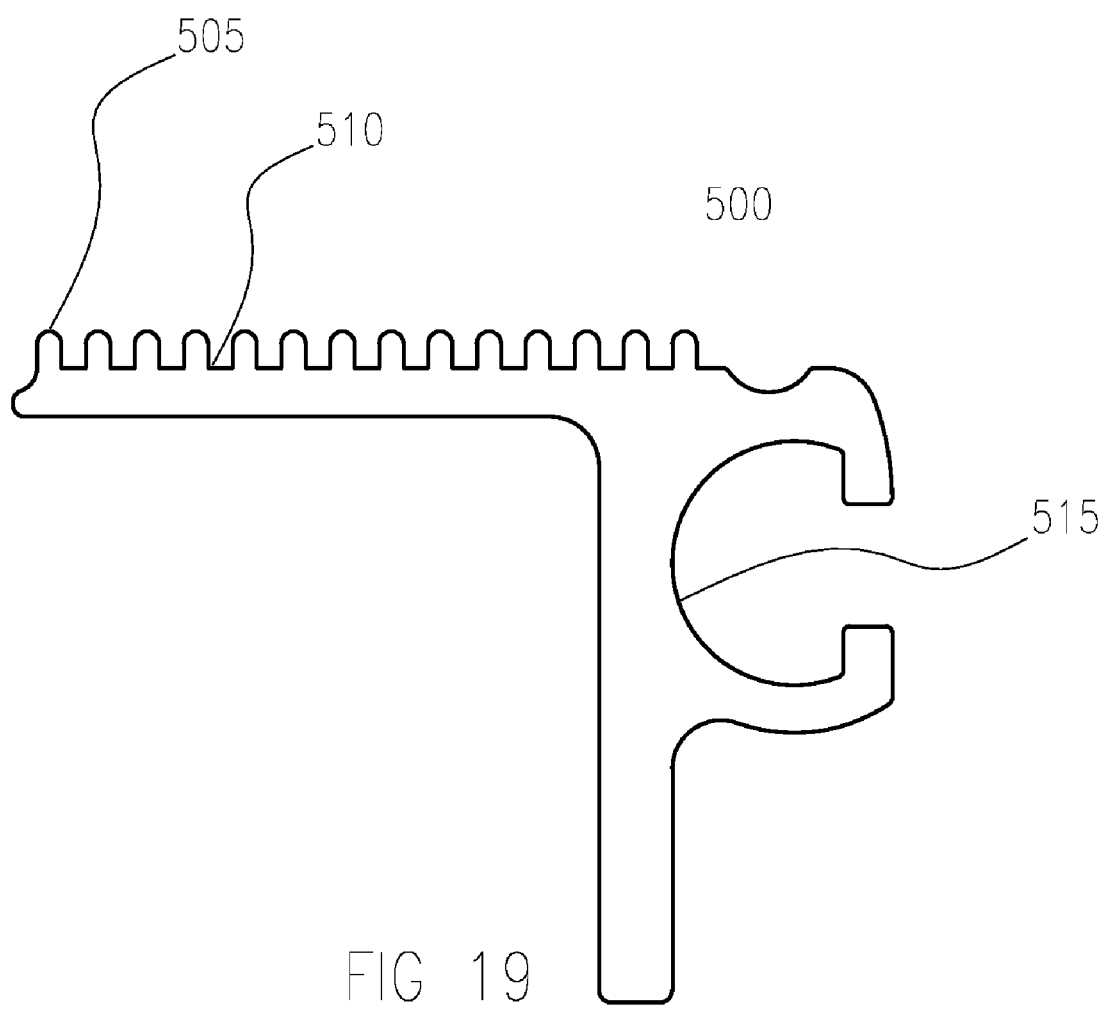
FIG. 19 is an embodiment stabilizer.

FIG. 17 illustrates an angled wheel embodiment. An upper angled wheel would engage surface 610 and lower angled wheel would engage surface 620. Both angled wheels engage wheel guide 600. Screw recess 630 accommodates lead screw 310. T-shaped inlet 640 may serve as an attachment point for optional equipment or structure of system as described above. FIG. 18 illustrates a single wheel embodiment. Single wheel recess 500 accommodates a single wheel. Screw recess 510 accommodates a lead screw. T-shaped inlet 530 provides an attachment point for optional equipment. FIG. 19 is an embodiment bed rail extrusion stabilizer, and is used to provide an attachment interface between the vertical supports 30b and 20b as illustrated by FIG. 10.

An alternative embodiment trolley 60b, as illustrated by FIG. 11, is formed of two horizontally extending trolley side beams 65b are held in a parallel position relative to each other by a transverse member 68b at the forwardmost end, and end truck 70b at the rearwardmost end. End truck 70b comprises a forward transverse member 75b and rearward transverse member 77b and may be affixed to extending members 65b by screw or other means. Engagement wheels 300 are mounted on the outside surfaces of each extending member 65b and are freely rotatable thereupon. In one embodiment, illustrated by FIG. 13B, a pair of wheels 300 is oriented above and below and engaged with guide 305. Of the pair, lower wheel 315, makes contact with guide 305 on its circumferential surface above its rotational axis. Upper wheel 320 makes contact with guide 305 on the surface below its rotational axis. Wheels 300 are in firm contact with guide 305. Also demonstrated on this view, lead screw 310 passes through cylindrical guide 69b which is attached to drive trolley as more fully described below.

Figure 21:
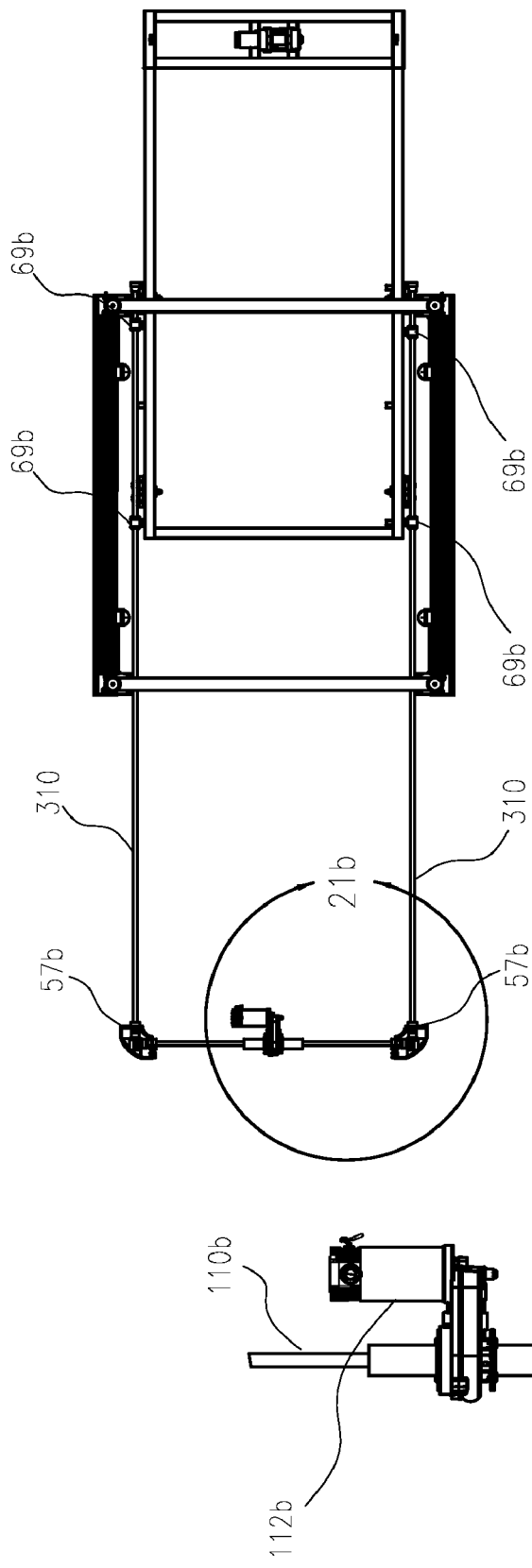
FIG. 21A is a top elevation view of the present invention illustrating an alternative embodiment lead screw drive assembly.
FIG. 21B is an enlarged detail view of circle 21B in FIG. 21A illustrating an alternative embodiment lead screw drive assembly.
Figure 22:
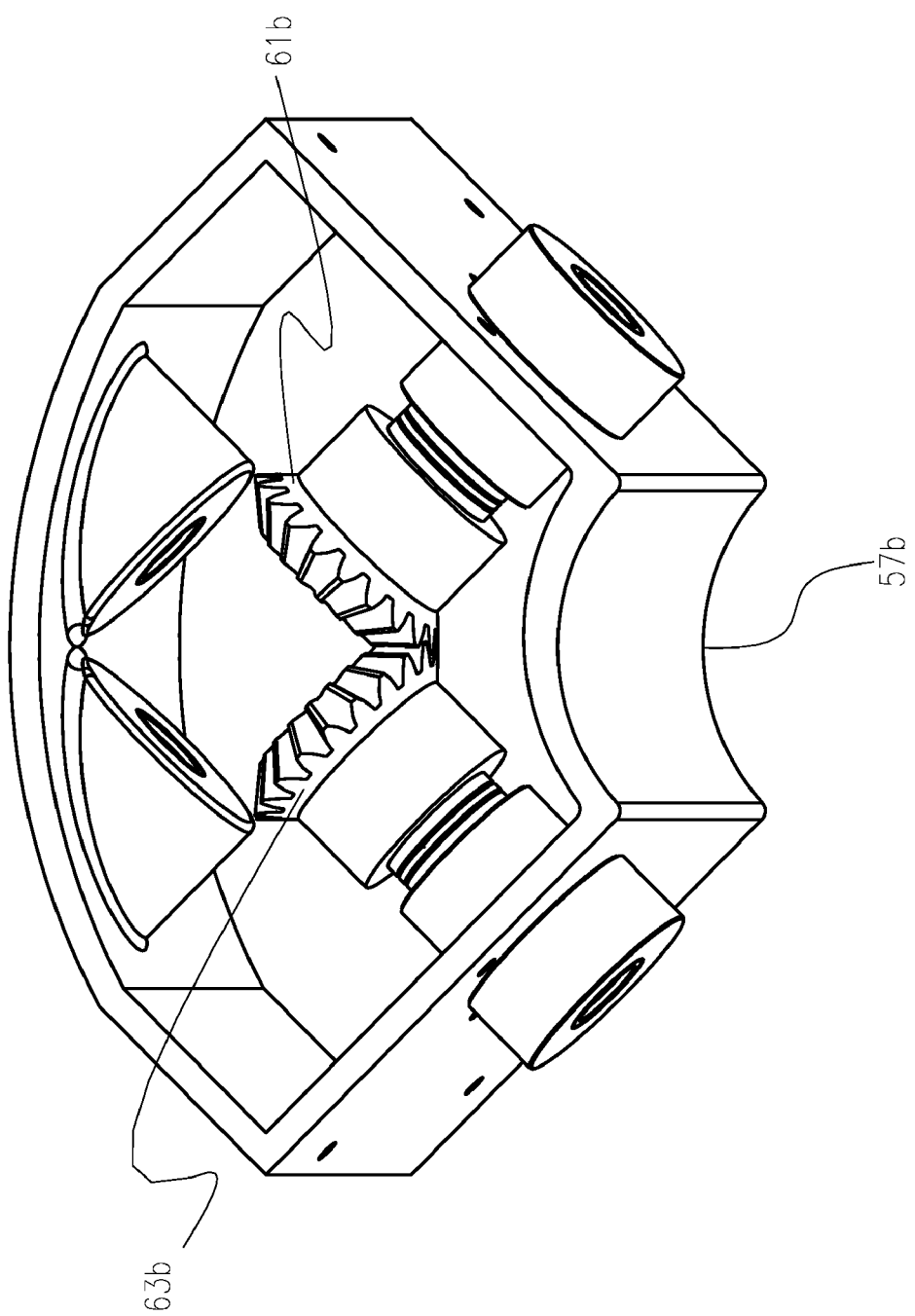
FIG. 22 is a perspective view of an embodiment miter box utilized in an embodiment lead screw drive assembly.

A drive means, which in one embodiment comprises a lead screw drive system, as illustrated by FIGS. 21A, 21B, and 22, is driven by motor 112b that drives drive shaft 110b. In an alternative embodiment, motor 112b is mounted on front 54b of horizontal support 50b. Motor 112b preferably provides ramping up, ramping down, encoded for position and motor braking to provide smooth motor starting and stopping performance. In one embodiment, as a non-limiting example, Bison gear model DC 562 Hollow Shaft Gearmotor may be used. Spring or bevel gear miter boxes may be used to transit the corner.

Operationally, motor 112b bidirectionally and rotatably drives the transverse drive shaft 110b which is fitted at the ends with a bevel gear 61b located in corner casting miter box 59b. Mounted longitudinally inside the side rails 52b are the lead screws 310. A bevel gear 63b is mounted on one end of lead screw 310, which has a first end and second end, the first end of which mates with corresponding bevel gear 61b. Using the corner castings 57b as supports, drive shaft 110b turns bevel gear 61b which turns corresponding bevel gear 63b, oriented at 90 degrees relative to said first gear, thereby changing the direction of the drive torque by 90° from lateral to longitudinal and rotationally driving lead screw 310. As viewed by FIG. 12B, affixed to the trolley side beams 65 is cylindrical guide 69b with internal threads corresponding to those of lead screw 310. Lead screw passes through and screwably engages cylindrical guide 69b, thereby allowing trolley 60b to move longitudinally to extend and retract relative to horizontal support structure 50b, along the linear path of lead screw 310 as it is turned by drive shaft 110b. In this embodiment, wheels 300 provide load carrying only; the force moving trolley 60b along is supplied by motor 112b turning the side mounted lead screws 310.

Figure 20:
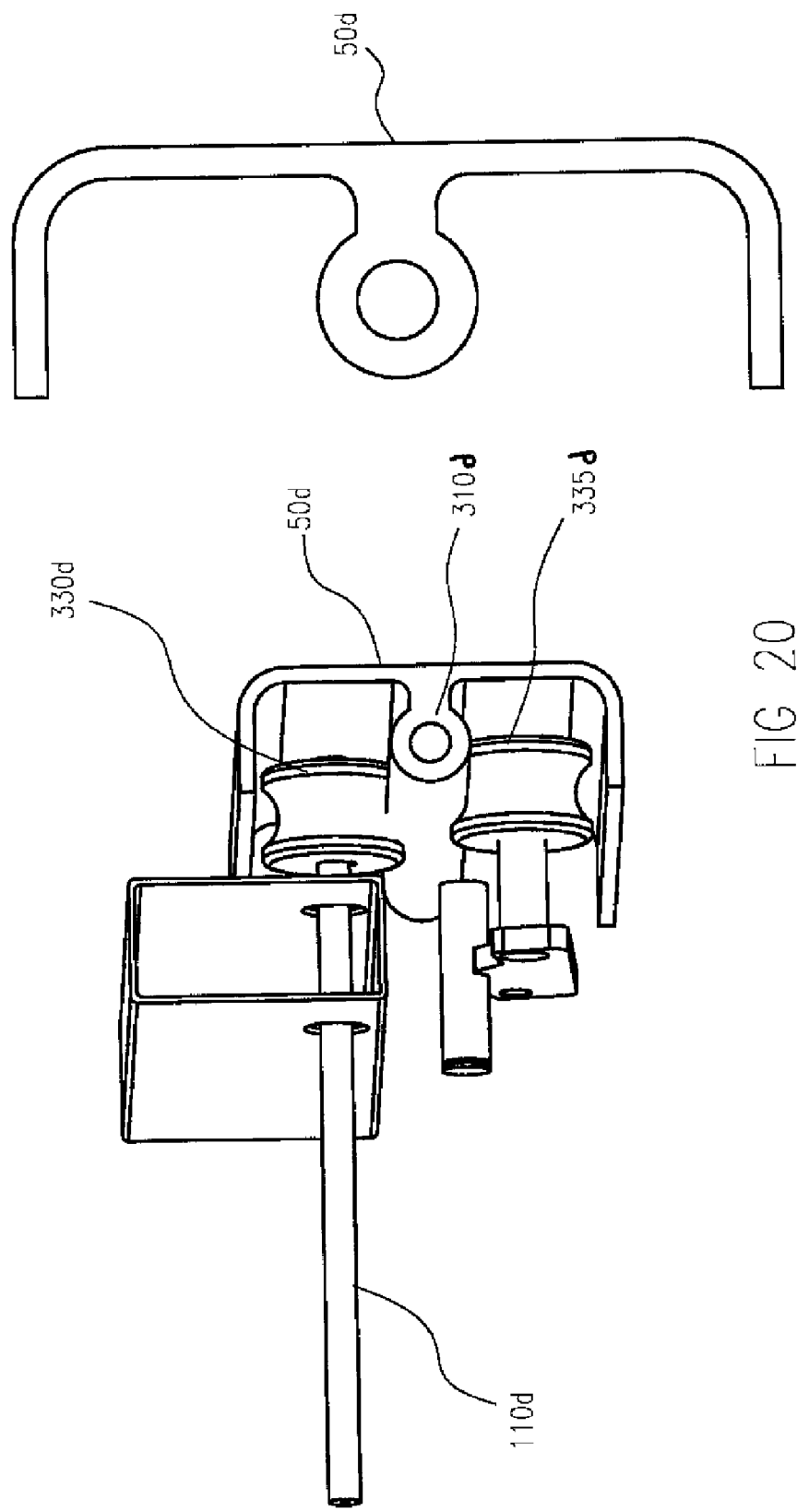
FIG. 20 is a perspective view of an alternative embodiment of the present invention illustrating a single tube assembly.

In an alternative embodiment, illustrated by FIG. 20, the system could use a trolley-mounted motor similar to the belt drive and rack drive systems described herein. In this embodiment, driveshaft 110d is coupled to drive wheel 330d which engages wheel guide 310d. Wheel guide 310d engages support wheel 335d. When wheel 330d is driven by motor, wheels 330d and 335d rotate and drive trolley 50d forward or reward.

Figure 23:
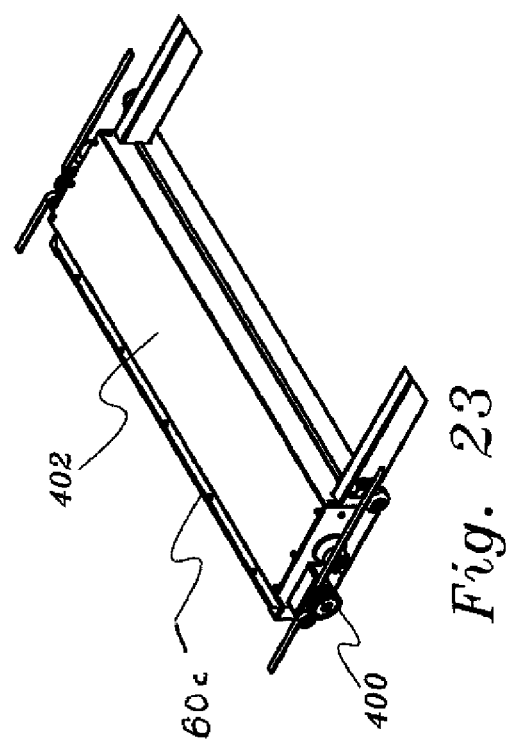
FIG. 23 is a perspective view of an alternative embodiment belt drive assembly.
Figure 24A:
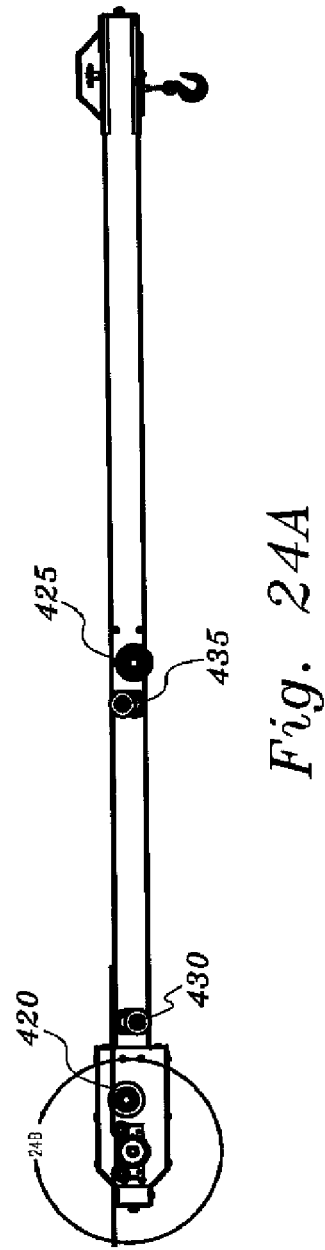
FIG. 24A is a side elevation view of an alternative embodiment belt drive assembly.

In an alternative embodiment, illustrated by FIGS. 23, 24A, and 24B drive means comprises a belt drive system mounted on trolley 60c. Motor (not shown) contained within motor housing 402 located on a relatively forward portion of trolley 60c. Motor (in a manner similar to that shown by FIG. 21B) is operatively coupled to and bidirectionally and rotatably drives shaft 110c, which passes through an aperture in said trolley to turn pulley wheel 400 that is affixed to shaft 110c. Belt 415 is anchored to horizontal member in a relatively forward and rearward location. Belt 415 feeds through belt idler 405, passes around pulley wheel 400, and second belt idler 410.

Functionally, as wheel 400 is rotatably driven, belt engages wheel 400, thereby driving trolley 60c longitudinally to extend or retract relative to horizontal member 50 as front load wheel 420 and rear load wheel 425, said wheels affixed to the outside of trolley 60c and freely rotatable thereupon. Load wheels 420 and 425 and engage a corresponding inner surface of sides 52. Adjustable stabilizing wheels 430 and 435 may be positioned upward or downward relative to the long axis of the rack to maintain load wheels 420 and 425 in contact with the wheel recess within side 50. As load wheels 420 and 425 are smaller than wheel recess, without stabilizing wheels 430 and 435, the trolley could rattle and perhaps become disengaged from the wheel recesses of sides 50.

In one embodiment, the outer surface of belt 415 has teeth to promote engagement with pulley wheel 400. In one embodiment, wheel 400 may have recesses or grooves to accommodate projections on belt 415. Of course, methods of promoting increased efficiency between a drive wheel and belt, are known in the prior art, and any such methods may be utilized to facilitate engagement.

For the various embodiment of the apparatus, enhanced mounted apparatus stability may be achieved by decreasing the probability of movement between the two. For example, FIG. 19 is an embodiment extrusion shape for a stabilizer, used to offer support for the vertical supports 30b, to advantageously secure the apparatus to the surface of a vehicle, such as to the top longitudinal surfaces of a truck bed. Stabilizer 1500 having notches and grooves 1510, is affixed to the surface of a truck on which the apparatus is to be mounted. A corresponding stabilizer 1500 is affixed to the underside of bed rail 20. The notches 1505 and grooves 1510 between the two register and provide enhanced stability. A D-slot 1515 permits optional anchoring and accessory mounting.

Figure 25:
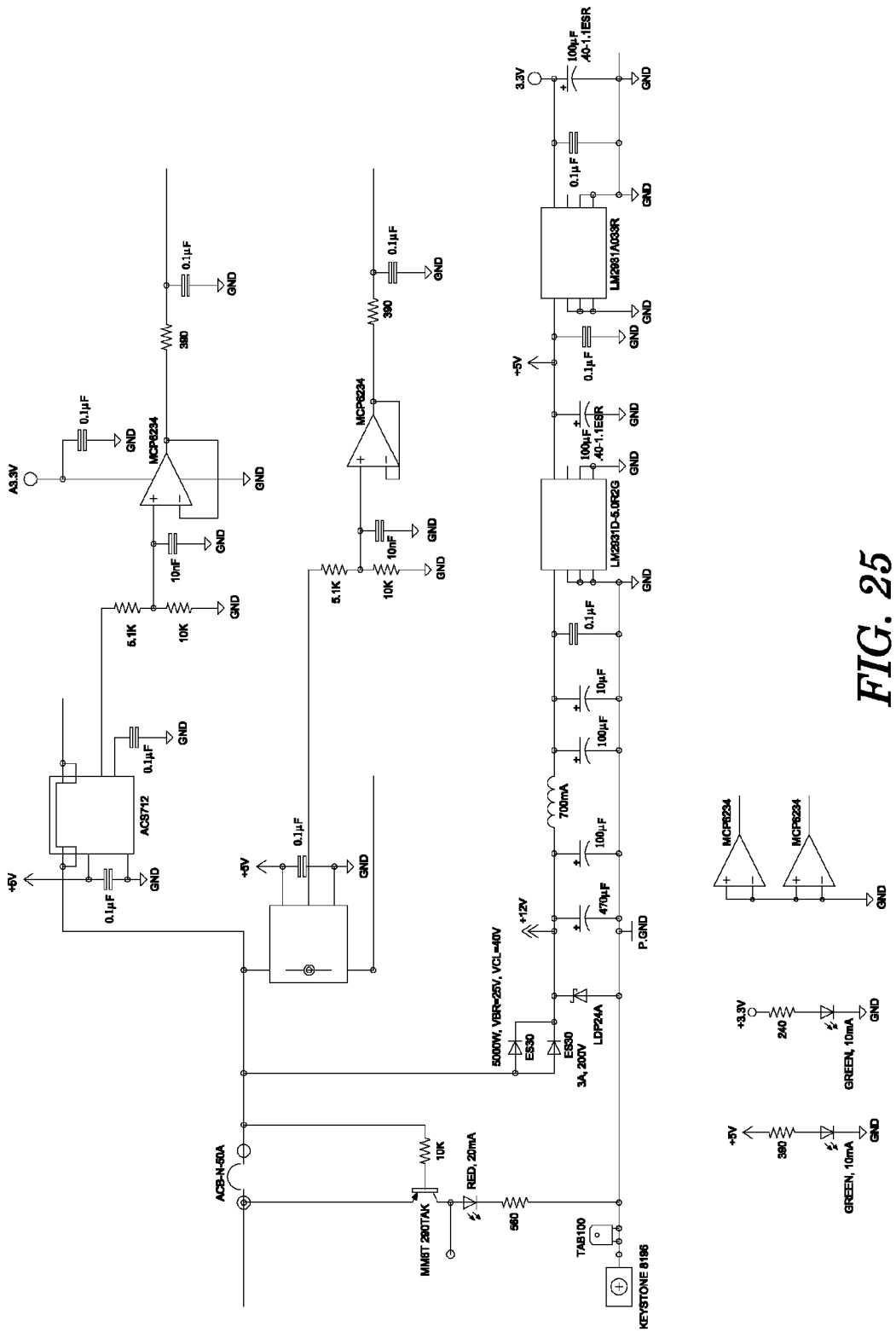
FIG. 25 is a schematic of a control means illustrating an embodiment power supply and current management system.

For the various embodiments of the present invention, various control means may be employed to manage operation of the rack. Turning now to FIG. 25, the schematic illustrates a non-limiting example embodiment depicting the control means power supply and current measurement. Voltage regulators provide +5 and +3.3 V required by the control electronics from the input of a power source, such as 12V from a power supply—such as a 12V truck battery. Schematic illustration FIG. 25, depicts input to the system on the left, +12V and GND. To enforce load limits on the hoist and trolley systems, current from the trolley and hoist motors is measured by Hall effect ICs. In one non-limited example embodiment, a Hall effect IC, such as an Allegro ACS756, may be used to measure the hoist current, and similarly, as an example embodiment, a Allegro ACS713 may be used to measure the trolley current. Operational amplifier circuits, such as Microchip Technology Inc. MCP6234 as a non-limiting example, condition the output signals of the current sensors for input to the microprocessor.

In one embodiment, current sensors outputs from the hoist and trolley are connected to an analog-to-digital converter input pin on a microcontroller, such as a Freescale MC9S08AC16. This embodiment provides that advantage of permitting flexibility in selecting and programming the desired value for the current sensors. Additionally, current may be monitored for data logging and wear and life calculations as well as misuse detection. Additionally, the current limit may be increased or decreased based on other variables or parameters. In another embodiment, output from the current sensors is directed toward a voltage comparator circuit adjusted so that when current exceeds a defined threshold limit, an output signal may be generated and current flowing to the motor may be disconnected or stopped.

Figure 26:
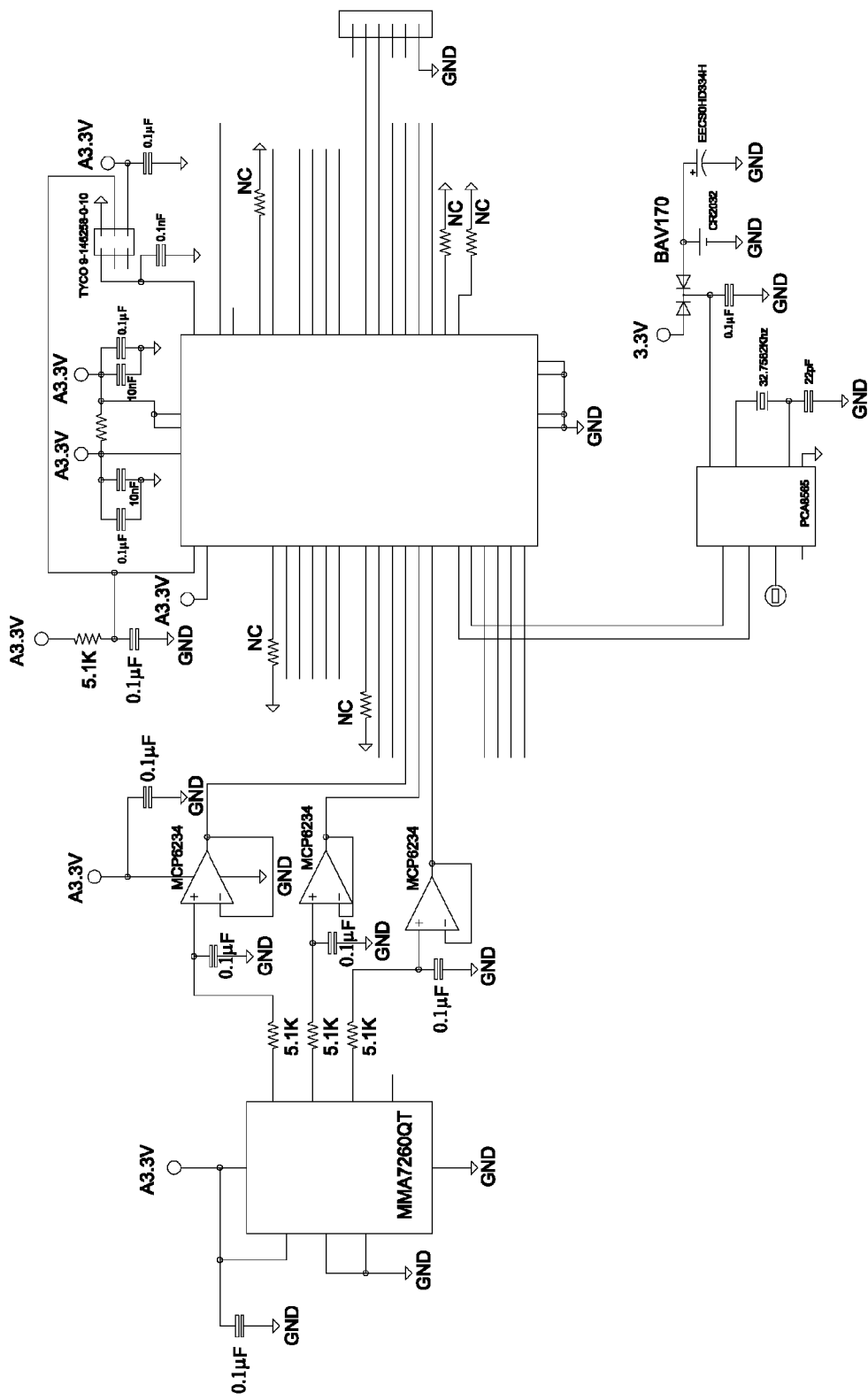
FIG. 26 is a schematic of a control means illustrating an embodiment CPU, tilt sensor, and real time clock.

FIG. 26, illustrates an embodiment CPU, tilt sensor, and real time clock. In one example embodiment, the CPU may be an integrated microcontroller, such as the Freescale MC9S08AC16, which offers internal RAM, flash memory, and an internal oscillator for low cost assembly and reliability. A tilt sensor, such as a 3 axis accelerometer (such as Freescale MMA7260Q) may be employed for tilt detection. The accelerometer is connected to op amp (such as Microchip MCP6234) for signal conditioning and thereafter connected to the microcontroller's analog-to-digital converter inputs. The circuit includes a 6 pin (2×3) port header for debugging and programming the flash memory, and a 6 pin serial header for serial port interface with a computer as well as datalog downloading. A real time clock, such as Philips PCA8565 may be utilized to support time stamps for data logging.

Figure 27:
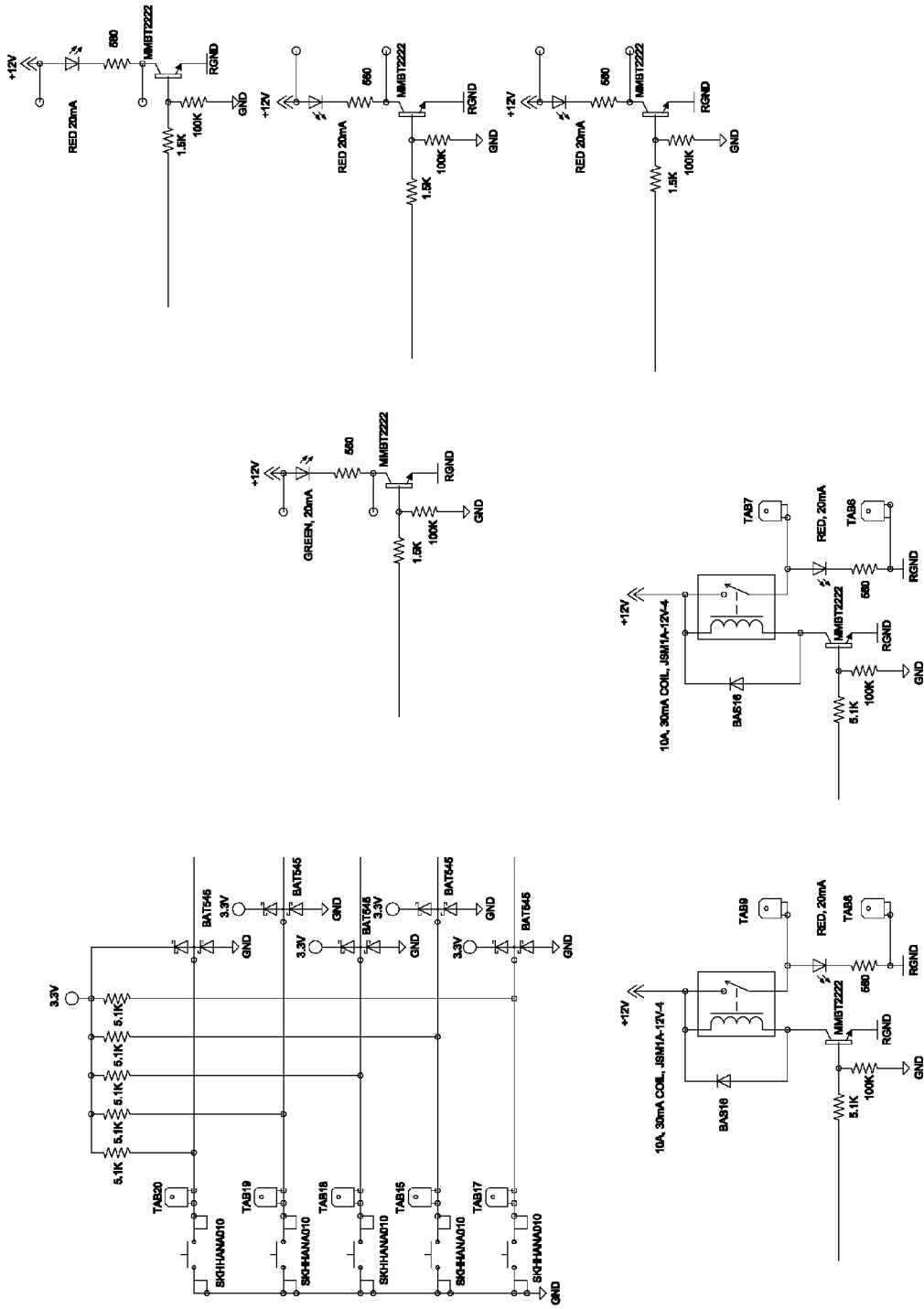
FIG. 27 is a schematic of a control means illustrating embodiment input switches and output indicators.

FIG. 27 illustrates input switches and output indicators. In one embodiment, there are 5 input switches including—3 tape switch inputs, and 2 limit switches. There are 6 output indicator circuits including: trolley overcurrent, hoist overcurrent, over tilt, trolley moving, buzzer, and an "all good" or nominal operation status.

The buzzer and trolley moving circuits control a 10A relay and include connection tabs to connect to external light and/or warning alarm devices. The other circuits allow for connection to 12 lights that can draw up to 0.5 A. The output indicator circuits include on-board LED indicator lights.

Figure 28:
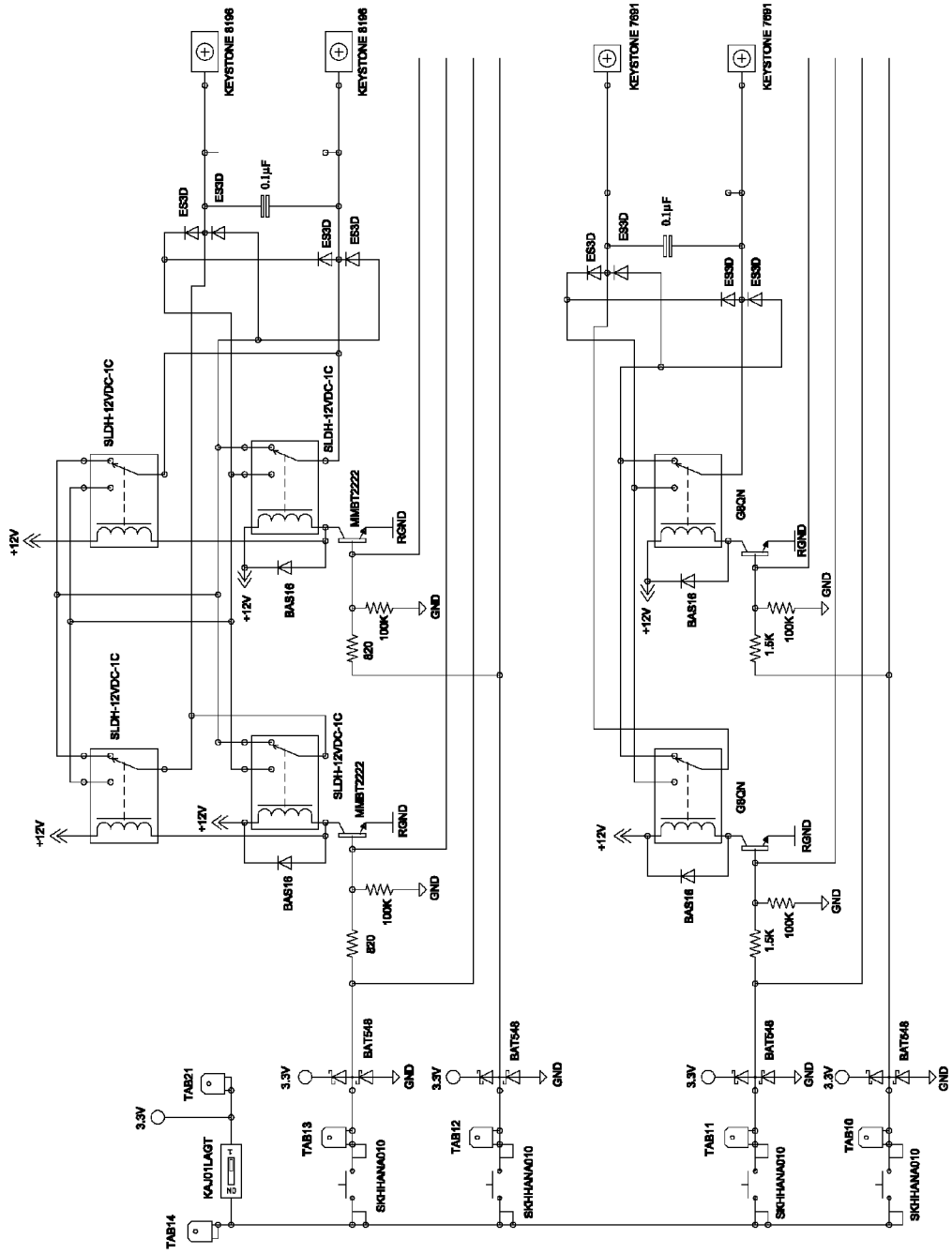
FIG. 28 is a schematic of a control means illustrating embodiment motor controls.
Figure 30:
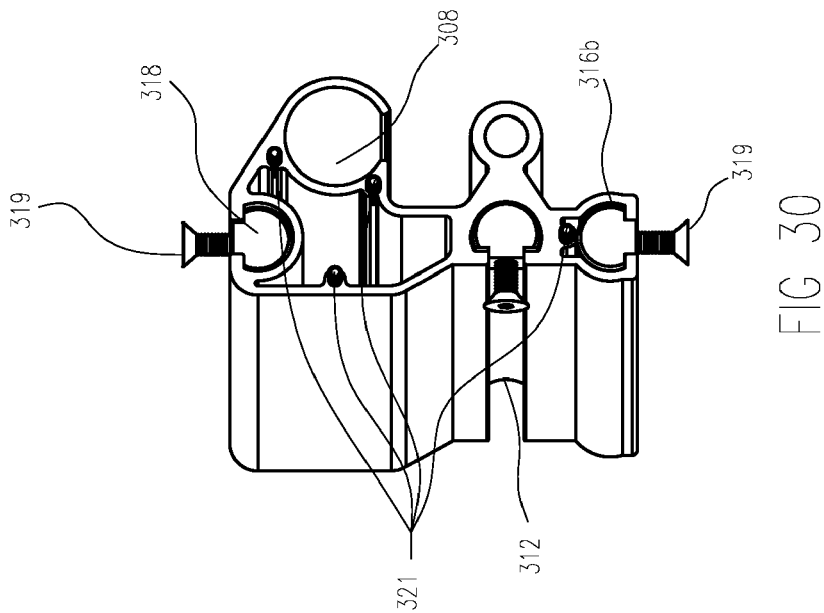
FIG. 30 is a perspective view of an embodiment side rail showing various alternative attachments and tie-downs.
Figure 29:
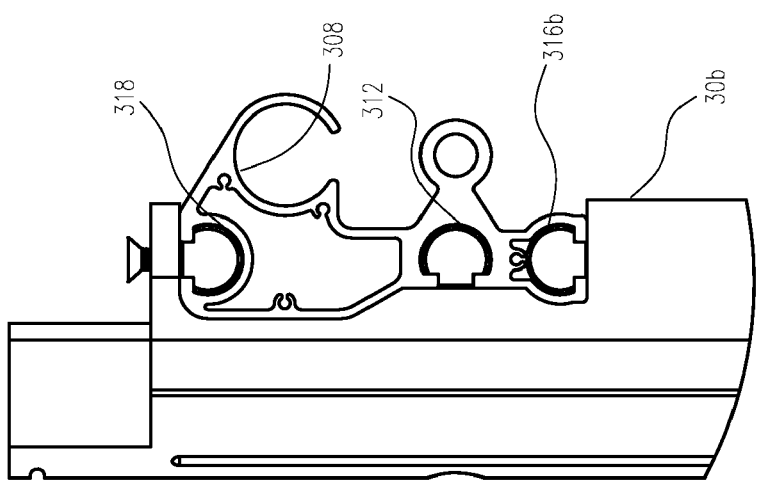
FIG. 29A illustrates an end view of an embodiment side in position.
FIG. 29B is an enlarged end view detail view of circle 29B in FIG. 29A illustrating a close up of the side of an embodiment.
Figure 29:
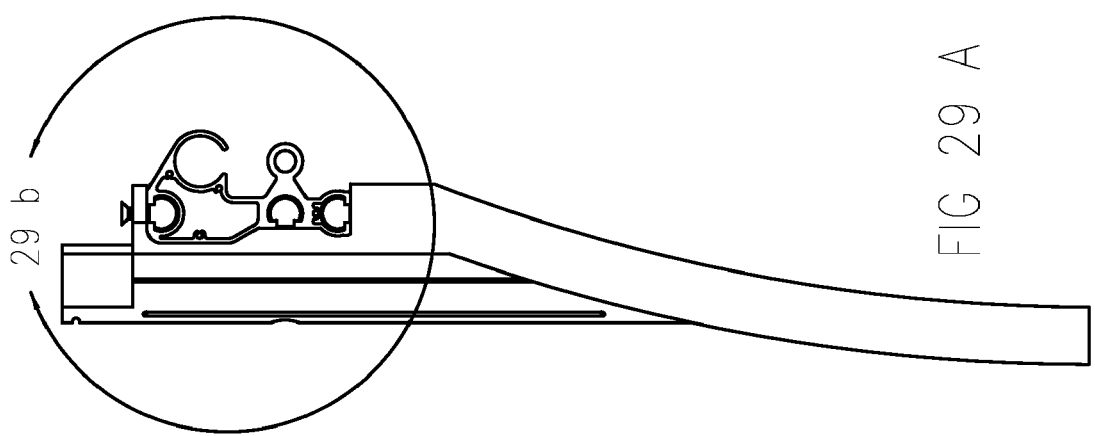

FIG. 28 illustrates embodiment DC motor controls having 5 switches, which include: up, down, forward, reverse, and emergency stop. If the emergency stop switch is disabled, all other movement switches are disabled. As a fail-safe, the emergency switch is a normally-closed switch, and the up, down, forward, and reverse are normally-open switches. Owing to the typically large amount of current required by the hoist motor, the hoist motor has parallel wired relays.

In one embodiment, a control pendant such as Giovenzana #PL05 or Bernstein #GGT-PL05 may be utilized to provide an emergency stop plus a 4 button function may be utilized to control both the trolley and hoist movement. The pendant includes the feature of emergency stop plus 4 control buttons of up, down, forward, and reverse. In a preferred embodiment, a control pendant will provide input to both a microcontroller and motor control circuitry. In one embodiment a wireless transmitter, such as the KTXWC series offered by Applied Wireless, may be used to control various aspects of system functioning including, for example, control trolley, hoist motor function, and emergency stop. In a preferred embodiment, a wireless receiver may be connected to the microcontroller to permit wireless actuation of the trolley and hoist motors as well as provide an emergency off switch.

In one embodiment, the rack may be utilized with an over-tilt detection means. One embodiment employs the use of well-known mercury switches.

The control means may operate in a variety of ways. For example, the two limit switches are designed detect trolley position and subsequent activation of the switch will cause circuitry to cause the active motor to stop and halt trolley movement. For example, where the trolley has reached maximum extension or retraction relative to the horizontal support, switches can be incorporated into the horizontal support to stop current flow to motor 112 when closed. Non-limiting example switches may be physical and magnetic reed. Additionally, the present invention may utilize proximity sensor switches, such as infrared or ultrasonic sensors, to detect a physical object in the trolley path and provide a signal to interrupt current to motor 112.

Further, the control means may operate to ensure the trolley is operated when the vehicle is in a safe attitude. For example, if the vehicle is oriented in a tilted position (e.g. static tilt) beyond a certain programmed reference value, for example 14 degrees in any direction, the microcontroller may be programmed to stop current flow to or inhibit motor 112, hoist motor, 80, or both. Further, certain threshold parameters may be programmed to prevent hoist motor operation where the frame may collapse or fail. The microprocessor analyzes voltages returning from the accelerometer output and compares voltages to a predetermined allowable threshold. Upper and lower limits are selected and programed reflecting maximum tilt in all directions including right, left, forward, and backward. Accelerometer outputs may be calculated on a vehicle after the rack is installed, to determine reference values on which to base tilt. Additionally, in certain embodiments, the microcontroller may be programmed to stop current flow to motor 112, hoist, 80, or both, where dynamic tilt (change in vehicle tilt during lifting) reaches a certain predefined value. It should be noted that the microcontroller may be programmed with a threshold value for each parameter indicated above, including but not limited to overcurrent values and tilt values.

The present invention further discloses a method of safely loading a load. The method includes first identifying a load to be moved. A truck mounted apparatus having a vertical support structure is provided, wherein a portion of said structure makes contact and rests upon the vehicle. The apparatus includes a horizontal member affixed to the vertical support structure; a trolley disposed substantially in the same plane as said horizontal member, reversibly extendable from the horizontal member. A hoist motor is mounted on a relatively rearward portion of the trolley, and a trolley drive means for reversibly extending the trolley relative to said horizontal member is included. The hoist motor may be actuated to lift a load vertically relative to the ground, and the trolley drive means, when actuated, may move the load horizontally relative to the ground, toward the vehicle. Then, the load may be lowered onto a vehicle. The apparatus also includes an overcurrent detection means, an overfill detection means to provide safe apparatus operation, a safety sensing means to avoid physical impact an injury with the apparatus or load, a DC motor controlling means to provide forward and reverse trolley movement, and up and down movement of said hoist motor and an emergency stop.

The load is attached to the apparatus, and the hoist motor actuated sufficient to raise said load above the highest level of the truck where said load is to be positioned. The trolley motor is actuated to drive trolley in a frontward direction, wherein said trolley with hoisted load is moved horizontally toward to front of said truck. When the desired horizontal position is reached the trolley is stopped, and the hoist motor is actuated to lower said apparatus into desired position.

It should be understood that for the various embodiment discussed and presented herein, certain embodiments may be used either together or distinct where possible.

Although the present invention has been described with reference to the preferred embodiments, it should be understood that various modifications and variations can be easily made by those skilled in the art without departing from the scope and spirit of the invention. Accordingly, the foregoing disclosure should be interpreted as illustrative only and is not to be interpreted in a limiting sense. It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

We claim:
1. A vehicle mounted loading rack comprising:
a bed rail wherein said bed rail is in contact with a truck bed;
a plurality of vertical support members affixed to the bedrail, wherein said vertical support members have a terminal aspect, wherein said vertical support members extend relatively vertically from said bed rail;
a plurality of utility posts slidably disposed within the terminal aspect of said vertical support members;
a horizontal member having sides and a front defining corners, wherein the sides of said horizontal member are affixed to said vertical supports, wherein said sides are formed of extruded aluminum and shaped to define a wheel guide and a lead screw recess;
a plurality of arcuate crossbar assemblies, wherein said plurality of arcuate crossbar assemblies comprises a front crossbar assembly and a middle crossbar assembly and a rear crossbar assembly, wherein said middle and front crossbar assemblies are disposed upon said utility posts and said rear crossbar assembly is affixed to said horizontal member;
a trolley having a front end and rear end, and outside edges;
at least two cylindrical lead screw guides affixed to said trolley, wherein said lead screw guides have an internal threading;
an end truck attached to the rear end of said trolley;
a pair of wheels mounted on said trolley and freely rotatable thereupon, wherein said wheels engage said wheel guide of said horizontal member;
a pressure sensitive break switch affixed to said end truck;
a hoist motor mounted on the end truck;
a trolley motor mounted on a relatively front portion of said horizontal member;
a transverse trolley drive shaft having ends, said drive shaft operatively coupled to said trolley motor, wherein said transverse trolley drive shaft is rotatably driven by said trolley motor;
a first bevel gear pair fitted at the ends of said transverse trolley drive shaft;
a second bevel gear pair, wherein one gear of said pair registers with one gear of said first bevel gear pair;
a pair of lead screws having a first end, said lead screws' first end coupled to the second bevel gears, wherein said lead screw passes through the cylindrical lead screw guides, threadably engaging said guide;
wherein upon trolley motor actuation, said trolley motor drives said transverse trolley drive shaft to turn the first and second bevel gear pairs, said lead screws are rotated, said rotated screws engaging internal threading of said cylindrical lead screw guide, driving trolley linearly relative to said horizontal support along trolley wheels to permit trolley extension and retraction of relative to said horizontal support.

* * * * *